(12) United States Patent
Ogura et al.

(10) Patent No.: US 11,228,635 B2
(45) Date of Patent: Jan. 18, 2022

(54) INFORMATION SHARING METHOD

(71) Applicant: NEC CORPORATION, Tokyo (JP)

(72) Inventors: Kazumine Ogura, Tokyo (JP); Yasuhiro Yamasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 543 days.

(21) Appl. No.: 16/089,550

(22) PCT Filed: Mar. 22, 2017

(86) PCT No.: PCT/JP2017/011327
§ 371 (c)(1),
(2) Date: Sep. 28, 2018

(87) PCT Pub. No.: WO2017/170010
PCT Pub. Date: Oct. 5, 2017

(65) Prior Publication Data
US 2020/0304558 A1    Sep. 24, 2020

(30) Foreign Application Priority Data
Mar. 30, 2016    (JP) .............................. JP2016-068540

(51) Int. Cl.
*H04L 29/08*    (2006.01)
(52) U.S. Cl.
CPC ............ *H04L 67/04* (2013.01); *H04L 67/104* (2013.01)
(58) Field of Classification Search
None
See application file for complete search history.

(56) References Cited

U.S. PATENT DOCUMENTS

| 7,647,346 | B2 * | 1/2010 | Silverman | G11B 27/10 707/999.107 |
| 9,807,780 | B2 * | 10/2017 | Fujita | H04L 67/1097 |
| 2005/0203991 | A1 * | 9/2005 | Kawamura | G10H 1/0058 709/203 |

(Continued)

FOREIGN PATENT DOCUMENTS

| JP | 2014-138241 A | 7/2014 |
| WO | 2011/071045 A1 | 6/2011 |

OTHER PUBLICATIONS

Sakiko Takenaka et al., "Performance Evaluation of Cooperative Information Sharing Methods in Opportunistic Networks due to Different Mobility Patterns," IEICE Technical Report, Feb. 29, 2016, 6 pgs., vol. 115, No. 496.

(Continued)

*Primary Examiner* — Backhean Tiv
(74) *Attorney, Agent, or Firm* — Sughrue Mion, PLLC

(57) ABSTRACT

Provided are a communication terminal, communication system, information sharing method and information sharing program, which are capable of reducing the control load when detecting duplicate held content among a plurality of communication terminals. A communication terminal comprises: a communication unit which communicates with another terminal; a content retention unit which retains content; a content list transmission and receiving unit which transmits and receives a content list relating to the retained content; and a transmission timing determination unit which determines the timing at which to transmit the content list on the basis of the number of held content items.

16 Claims, 19 Drawing Sheets

(56) References Cited

U.S. PATENT DOCUMENTS

| | | | | |
|---|---|---|---|---|
| 2006/0129578 | A1* | 6/2006 | Kim | H04N 21/8106 |
| 2008/0005358 | A1* | 1/2008 | Kwon | H04L 12/2812 |
| | | | | 709/248 |
| 2008/0244067 | A1* | 10/2008 | Ushiyama | H04L 41/5054 |
| | | | | 709/224 |
| 2009/0177810 | A1* | 7/2009 | Kweon | H04L 67/303 |
| | | | | 710/33 |
| 2011/0119233 | A1* | 5/2011 | Reddy | H01L 21/31116 |
| | | | | 707/624 |
| 2011/0125712 | A1* | 5/2011 | Kaila | G06F 16/44 |
| | | | | 707/626 |
| 2011/0137916 | A1* | 6/2011 | Deen | G06F 16/4387 |
| | | | | 707/747 |
| 2011/0191305 | A1* | 8/2011 | Nakamura | G06F 3/0641 |
| | | | | 707/692 |
| 2012/0246275 | A1* | 9/2012 | Ueda | H04W 28/06 |
| | | | | 709/217 |
| 2014/0032710 | A1* | 1/2014 | Shin | H04L 67/1004 |
| | | | | 709/217 |
| 2014/0237083 | A1* | 8/2014 | Astudillo | H04L 67/06 |
| | | | | 709/219 |
| 2015/0057023 | A1* | 2/2015 | Evennou | H04W 4/021 |
| | | | | 455/456.3 |
| 2015/0332225 | A1* | 11/2015 | Schulz | H04L 65/60 |
| | | | | 705/26.81 |
| 2017/0325153 | A1* | 11/2017 | Ogura | H04W 28/021 |
| 2020/0304558 | A1* | 9/2020 | Ogura | G06F 13/00 |

OTHER PUBLICATIONS

Amin Vahdat et al., "Epidemic Routing for Partially-Connected Ad Hoc Networks," Duke Tech Report CS-2000-06, 2000, 2 pgs.

International Search Report for PCT/JP2017/011327 dated May 16, 2017 (PCT/ISA/210).

Written Opinion of the International Search Authority for PCT/JP2017/011327 dated May 16, 2017 (PCT/ISA/237).

* cited by examiner

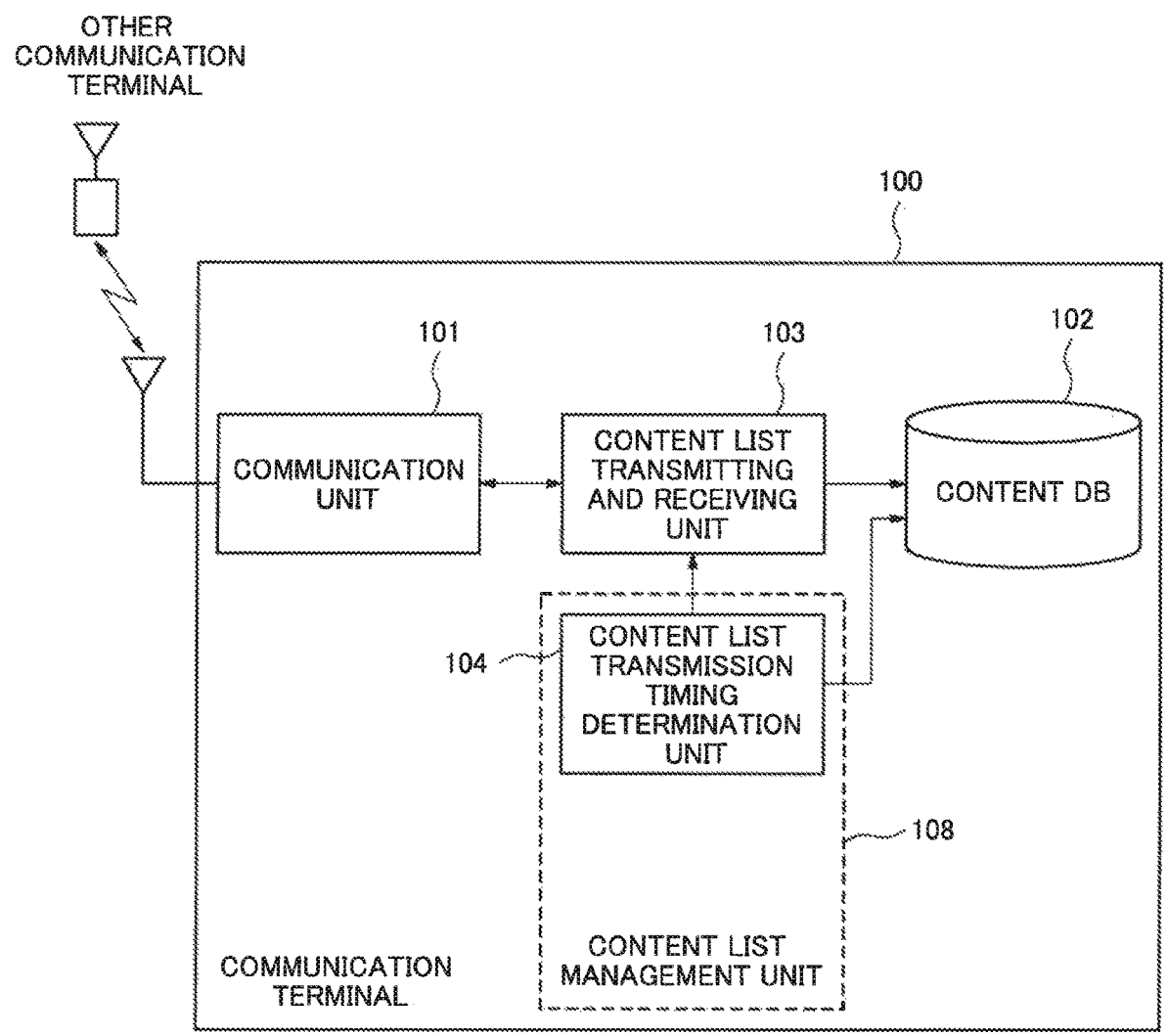

INFORMATION SHARING METHOD

CROSS REFERENCE TO RELATED APPLICATIONS

This application is a National Stage of International Application No. PCT/JP2017/011327 filed Mar. 22, 2017, claiming priority based on Japanese Patent Application No. 2016-68540, filed Mar. 30, 2016, the disclosure of which is incorporated herein in its entirety by reference.

TECHNICAL FIELD

The present invention relates to an information sharing method, and particularly relates to sharing of a content held by a plurality of communication terminals.

BACKGROUND ART

When communication terminals, such as a smart phone and a tablet, that have a short distance communication function are used, sharing a content between communication terminals that are present within a communication range of each other enables the content to be distributed to a destination communication terminal that cannot be reached practically by means of short distance communication. Examples of the short distance communication function includes WiFi and Bluetooth (Registered Trademark). For example, a scenario is assumed in which, as illustrated in FIG. 1A, a communication terminal, after having shared a content with another communication terminal while both communication terminal were present within a communication range of each other, has moved and shares the content again with still another passing communication terminal. Under the scenario illustrated in FIG. 1A, placing a replica of the content at a relaying communication terminal enables the content to be distributed (or a reachability rate to be improved) to a destination communication terminal that cannot be reached practically by means of short distance communication. In Non-Patent Literature 1 (NPL1), a technology of, by creating a replica of a content and providing a passing communication node with the replica, distributing the contents to a specific node is examined.

For example, a network in which, as illustrated in FIG. 18A, terminals are arranged in a distributed manner and information exchange can be performed only between terminals passing each other is assumed. The network is in a situation where, since each terminal has a possibility of malfunctioning or performing a power-off operation, a content generated by a terminal may be lost from within the network. In order to prevent a content from being lost from within the network even under such a situation, it is necessary to place a replica of the content in a passing terminal. However, when a content is indiscriminately transmitted under a situation where which content a passing terminal holds is unknown, an inefficient communication in which a content that the passing terminal holds is transmitted duplicately is performed. In order to perform an efficient communication, it is required to confirm whether or not a content that a passing terminal holds duplicates any content that the terminal itself holds.

In addition, under a scenario in which, as illustrated in FIG. 18B, a plurality of terminals are interconnected in a wired manner, placing a replica in the network in a similar manner to the above scenario is considered. Even under this situation, when wired links are unstable and a communication cut-off occurs, it is required to, when a communication is established, grasp contents that terminals that have established the communication hold and confirm whether or not sufficient replicas are present within the network. In the situation as described above, it is important to detect a duplicate held content with respect to terminals that have established communication.

Patent Literature 1 (PTL1) relates to an information sharing system including a plurality of communication devices that are communication-connected to one another in a wireless manner. PTL1 proposes that a communication device estimates information that another communication device holds at present, determines whether or not the estimated information that the another communication device holds at present coincide with information that the device itself holds, and, when determining that the information in the another communication device does not coincide with the information in the device itself, transmits a notification message including the information that the communication device itself holds.

CITATION LIST

Patent Literature

[PTL1] WO2011/071045

Non Patent Literature

[NPL1] A. Vahdat and D. Becker, "Epidemic routing for partially connected ad hoc networks", Duke Tech Report CS-2000-06, 2000

SUMMARY OF INVENTION

Technical Problem

However, the information sharing methods described above have a following issue.

Under the scenarios described in the background art, in a situation where, for example, a charge level of a battery of a terminal is low or communication quality of links is low, it is required to detect a duplicate held content with a low amount of control load. In the above, the situation where communication quality of links is low indicates a situation where packet loss is large, delay is large, a band is narrow, or the like.

For example, a method for detecting a duplicate held content as illustrated in FIG. 19A is conceivable. Communication terminals A and B that have established communication therebetween may exchange content list messages ($SV_A$ and $SV_B$ in the FIG. 19A) relating to contents held by the respective communication terminals. When a mean control load required for either of two communication terminals passing each other to detect a duplicate held content is denoted by Load1, Load1 is calculated by the formula (1) below.

$$\text{Load1} = \text{SVsize}_A \text{ or } \text{SVsize}_B \qquad (1)$$

It is assumed that $\text{SVsize}_A$ and $\text{SVsize}_B$ denote message sizes of $SV_A$ and $SV_B$, respectively. In this case, sets of contents held by the communication terminals A and B are illustrated in FIG. 19B. It is assumed that the sizes of circles respectively indicate the numbers of contents held by the communication terminals A and B. That is, in this case, the number of held contents in the communication terminal B is larger than the number of held contents in the communication terminal A. In this situation, when the communication terminal B transmits a content list first, the control load Load1 becomes $SVsize_B$. On the other hand, when the communication terminal A transmits a content list first, the control load Load1 becomes $SVsize_A$ and the control load decreases.

A first issue is that, when either of such communication terminals that have established communication therebetween detects a duplicate held content, the control load increases depending on situations.

A case where, between communication terminals that have established communication therebetween, both communication terminals detect a duplicate held content is considered. In this case, a control load Load2 required for both communication terminals to detect a duplicate held content is calculated by the formula (2) below.

$$Load2 = SVsize_A + SVsize_B \quad (2)$$

The control load Load2 is the sum of $SVsize_A$ and $SVsize_B$. When either or both of $SVsize_A$ and/or $SVsize_B$ increase, the control load, which is the sum thereof, increases.

A second issue is that, when, between such communication terminals that have established communication therebetween, both communication terminals detect a duplicate held content, the control load increases.

Last, a case where, between communication terminals that have established communication therebetween, either one detects a duplicate held content and transmits an unheld content to the other communication terminal with which communication has been established is considered. This operation is illustrated in FIG. 19C. In FIG. 19C, an exchange of messages by which the communication terminal A transmits a content not held by the communication terminal B is illustrated. Based on the message exchange, a control load Load3 required for an unheld content to be transmitted to either of communication terminals that have established communication therebetween is calculated by the formula (3) below.

$$Load3 = SVsize_B + Content_{A \cap \neg B} \quad (3)$$

The control load Load3 is the sum of $SVsize_B$ and a size of an unheld content. On this occasion, even when $Content_{A \cap \neg B}$ does not change, the control load increases as $SVsize_B$ increases. Note that it is assumed that the symbols "¬B" indicate a content not held by the terminal B.

A third issue is that, when, between such communication terminals that have established communication therebetween, either one detects a duplicate held content and transmits an unheld content to the other communication terminal, the control load increases.

An object of the present invention is to provide a communication terminal, a communication system, an information sharing method, and an information sharing program that are capable of reducing the amount of control load on the occasion when a plurality of communication terminals detect a duplicate held content.

Solution to Problem

To achieve the above-mentioned object, a communication terminal according to the present invention, comprises:
 a communication unit that communicates with another terminal;
 a content retention unit that retains a content;
 a content list transmitting and receiving unit that transmits and receives a content list relating to a retained content; and
 a transmission timing determination unit that determines a transmission timing of the content list, based on the number of held contents.

A communication system according to the present invention, comprising a communication terminal includes:
 a communication unit that communicates with another terminal;
 a content retention unit that retains a content;
 a content list transmitting and receiving unit that transmits and receives a content list relating to a retained content; and
 a transmission timing determination unit that determines a transmission timing of the content list, based on the number of held contents.

An information sharing method according to the present invention, for detecting a content held duplicately between a plurality of communication terminals, the method comprises:
 retaining a content;
 transmitting and receiving a content list with another communication terminal;
 detecting a duplicate held content; and
 determining a transmission timing of a content list, based on the number of held contents.

An information sharing program according to the present invention, for making a computer function as:
 communication means for communicating with another terminal;
 content retention means for retaining a content;
 content list transmitting and receiving means for transmitting and receiving a content list relating to a retained content(s); and
 transmission timing determination means for determining a transmission timing of the content list, based on the number of held contents.

Advantageous Effect of Invention

According to the present invention, it becomes possible to reduce amount of control load on the occasion of detecting a duplicate held content held duplicately by a plurality of communication terminals. The present invention enables control load on the occasion of detecting a duplicate held content held duplicately by a plurality of communication terminals to be reduced.

BRIEF DESCRIPTION OF DRAWINGS

FIGS. 2A and 2B are a functional block diagram of a communication terminal of a first example embodiment that communicates with another communication terminal and a data format of a content DB, respectively.

FIG. 18 FIGS. 18A and 18B are a conceptual diagram describing an arrangement of nodes and a transition diagram illustrating a second assumed scenario, respectively.

EXAMPLE EMBODIMENT

Preferred example embodiments of the present invention will be described in detail with reference to the drawings.

First Example Embodiment

Figures 1A, 1B:
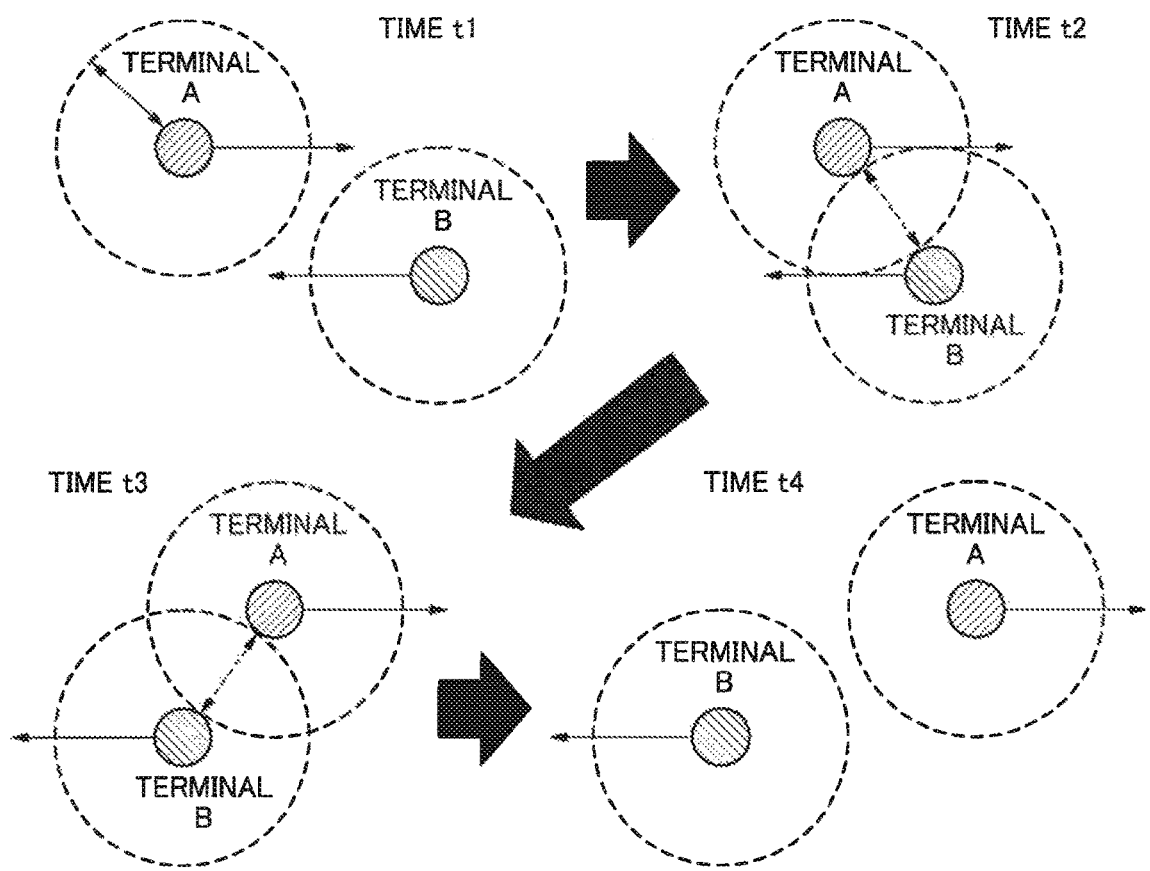
FIGS. 1A and 1B are a transition diagram illustrating a first assumed scenario and a diagram illustrating a situation of held contents, respectively.

First, an information sharing method according to a first example embodiment of the present invention will be described. Assuming a network environment in which no communication terminal knows a content that another communication terminal holds, the information sharing method according to the present example embodiment will be described using FIG. 1. In FIG. 1A, two communication terminals A and B are initially present outside a communication range of each other (time t1), come close to each other, and, at time t2, enter the communication range of each other and establish communication therebetween. It is supposed that a connection is maintained until time t3 and, subsequently, the communication is cut off again at time t4.

It is assumed that the communication terminals A and B hold contents as illustrated in FIG. 1B at the point of time t1. That is, the communication terminal A holds two contents having content IDs C2 and C3. On the other hand, the communication terminal B holds eight contents having content IDs C1, C3, . . . , and C13. As used herein, a content ID is a code that enables a content to be identified, and examples of the content ID include a content name, a content number (a sequential number and the like), and a hash value thereof.

A method of the example embodiment of the present invention for, on that occasion, detecting a content (C3) that the communication terminals A and B hold duplicately will be described.

[Explanation of Configuration]

FIGS. 2A and 2B are a functional block diagram of a communication terminal of the first example embodiment that communicates with another communication terminal and a data format of a content DB, respectively. In FIG. 2A, a communication terminal 100 according to the first example embodiment of the present invention includes a communication unit 101, a content database 102 (content DB 102) that holds a content(s), and a content list transmitting and receiving unit 103 that performs transmission/reception processing of a content list. The communication terminal 100 further includes a content list transmission timing determination unit 104 that determines a transmission timing of a content list.

A content list management unit 108 includes the content list transmission timing determination unit 104 in the first example embodiment and has a function of instructing the content list transmitting and receiving unit 103 to transmit a content list at a calculated transmission timing. It does not matter whether a communication link between the communication terminal and another communication terminal is wireless or wired.

The communication unit 101 is provided with two functions.

The first of the two functions is to receive a content list message from another communication terminal and output a content list in the received message and the terminal identifier of a content list message transmission source communication terminal to the content list transmitting and receiving unit 103. As used herein, it is assumed that a content list message is a message that includes a content list and the terminal identifier of the terminal itself. The content list is a list of a content ID(s) and may include a plurality of content IDs.

The second of the two functions is to generate a content list message including the terminal identifier of the terminal itself from a content list that is received from the content list transmitting and receiving unit 103 and transmit the generated content list message to another arbitrary communication terminal. It is assumed that, when a communication terminal is specified by the content list transmitting and receiving unit 103, the above-described arbitrary communication terminal is the specified communication terminal. When no communication terminal is specified, the above-described arbitrary communication terminal may be selected in advance out of known communication terminals present within the network, may be a randomly selected communication terminal, may be a selected plurality of communication terminals (multicast), or may be all communication terminals (broadcast).

The content DB 102 stores a content(s) by associating substantial data of each content with a content ID, as illustrated in FIG. 2B.

The content list transmitting and receiving unit 103 is provided with two functions.

The first of the two functions is to request the communication unit 101 to transmit a content list to an arbitrary communication terminal. Specifically, when receiving a content list transmission instruction from the content list transmission timing determination unit 104, the content list transmitting and receiving unit 103 acquires a list of the content ID(s) of a held content(s) in the terminal itself from the content DB 102. The content list transmitting and receiving unit 103 requests the communication unit 101 to transmit the content list to another communication terminal without specifying a destination.

The second of the two functions is to receive a content list and the terminal identifier of a content list message transmission source communication terminal from the communication unit 101, compare the received content list with a held content list of the terminal itself, and detect a duplicate held content held duplicately by the terminal itself and the content list message transmission source communication terminal. Specifically, the content list transmitting and receiving unit 103 acquires a held content list of the terminal itself from the content DB 102 and, by collating the acquired held content list with the content list received from the communication unit 101, detects a duplicate held content.

The content list transmission timing determination unit 104 is provided with two functions.

The first of the two functions is to determine a transmission timing of a content list, based on the number of held contents in the terminal itself.

The second of the two functions is to output a content list transmission instruction to the content list transmitting and receiving unit 103 at a determined transmission timing.

In the first function, the transmission timing of a content list is calculated based on any of the following three criteria. It is assumed that calculating a transmission timing of a content list may be performed periodically or unperiodically.
1. "probability"
2. "interval time"
3. "back-off time"

First, when the "probability" is employed for calculating a transmission timing of a content list, a content list transmission instruction is output to the content list transmitting and receiving unit 103 with a probability p (0≤p≤1). For example, the probability p is calculated in accordance with the formula (4) below.

$$p = \frac{X_{threshold}}{X} \quad (4)$$

In the above formula, X and $X_{threshold}$ denote the number of contents that the terminal itself holds and a constant, respectively. It is assumed that, when p exceeds 1, p=1 holds. A case where p=0.5 holds means outputting a transmission instruction of a content list to the content list transmitting and receiving unit 103 with a probability of half every time a transmission timing of a content list is calculated.

Next, when the "interval time" is employed for the calculation of a transmission timing of a content list, the content list transmission timing determination unit 104 outputs a content list transmission instruction to the content list transmitting and receiving unit 103 at every interval time $t_{update}$. The calculation of a transmission timing of a content list may be performed independently of operation of a timer counting the interval time. For example, $t_{update}$ is updated in accordance with the formula (5) or (6) below.

$$t_{update} = t_{previous} \times \frac{X_{update}}{X_{previous}} \quad (5)$$

In the above formula, $t_{previous}$ denotes an interval time before update, and the number of held contents in the terminal itself at the time of the previous update and the number of contents at present are denoted by $X_{previous}$ and $X_{update}$, respectively.

Alternatively, instead of using past information ($t_{previous}$ and $X_{previous}$), $t_{update}$ may be calculated independently in accordance with the formula (6) below. Assuming that the number of held contents in the terminal itself is denoted by X, $$t_{update} = k \times X^a \quad (6)$$

It is assumed that, in the above formula, k and a are constants.

Last, when the "back-off time" is employed for the calculation of a transmission timing of a content list, a transmission timing is calculated as follows. That is, the content list transmission timing determination unit 104 outputs a transmission instruction of a content list to the content list transmitting and receiving unit 103 $t_{backoff}$ (seconds) after the completion of calculation of a transmission timing of a content list. For example, $t_{backoff}$ is calculated in accordance with the formula (7) below:

$$t_{backoff} = l \times X^b \quad (7)$$

It is assumed that, in the above formula, l and b are constants.

All the methods are only examples, and any method may be employed as long as the method calculates a transmission timing in such a way that a communication terminal that has a smaller number of contents transmits a content list first.

Figure 3:
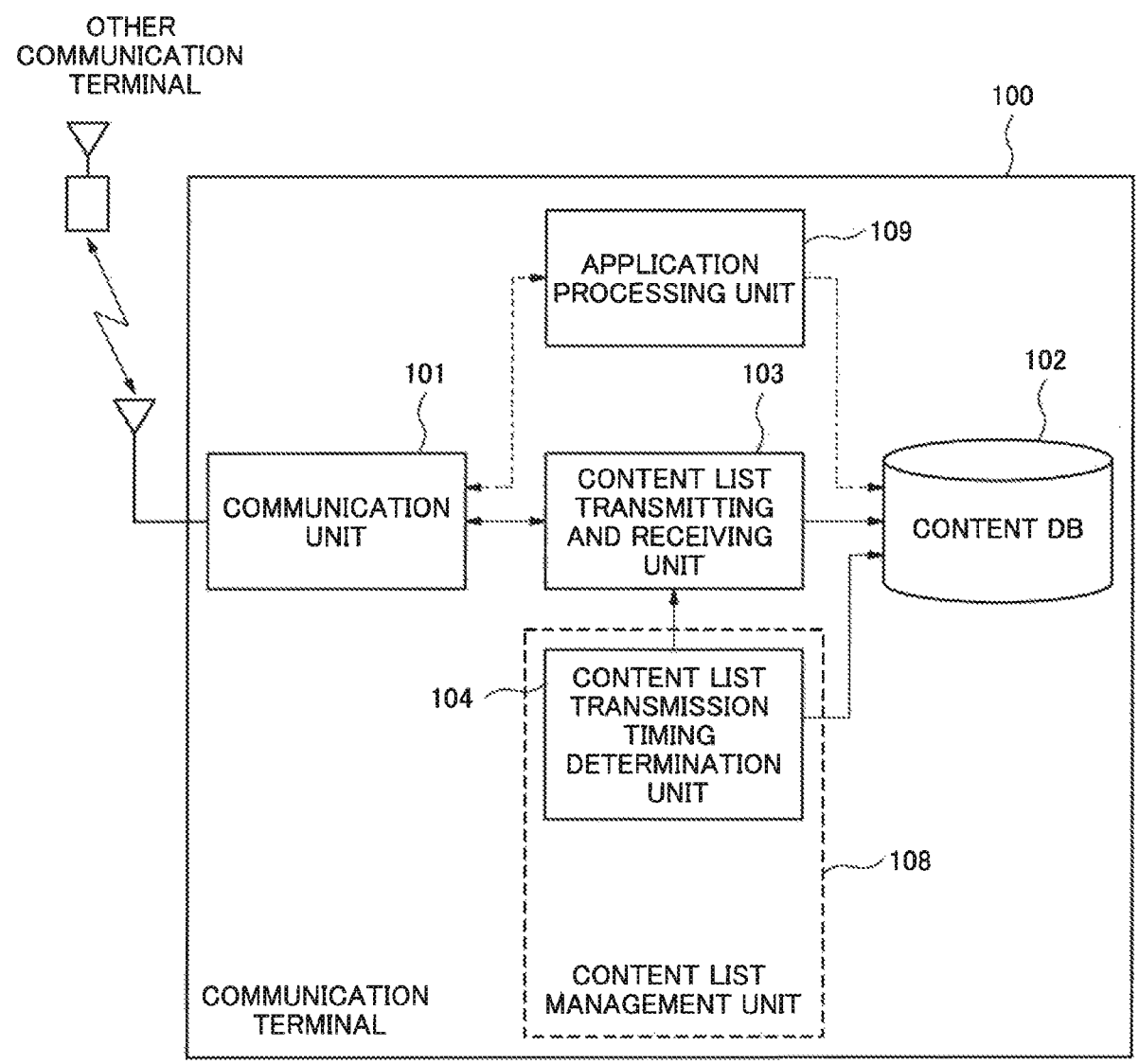
FIG. 3 is a functional block diagram illustrating a modified communication terminal of the first example embodiment.

In the present example embodiment, substantial data of a content may be exchanged between communication terminals, and each communication terminal may further include an application processing unit that processes substantial data of a content. A configuration in that case is illustrated in FIG. 3. The communication terminal 100 in FIG. 3 further includes an application processing unit 109. The communication terminal 100 is the same as the communication terminal illustrated in FIG. 2A except a portion related to the application processing unit 109.

The application processing unit 109 in FIG. 3 is provided with two functions.

The first of the two functions is a function of acquiring an arbitrary content (a content ID and substantial data) from the content DB 102 and requesting the communication unit 101 to transmit the acquired content to another arbitrary communication terminal. It is assumed that a content and a transmission destination communication terminal of the content may be selected at random, a plurality of contents and a plurality of transmission destination communication terminals of the contents may be selected, or all contents and all transmission destination communication terminals of the contents may be selected. The function may be performed at any timing. For example, the function may be performed periodically or at randomly selected times.

The second of the two functions is a function of storing a content ID and substantial data of a content received from the communication unit 101 in the content DB 102.

When the communication terminal 100 includes the application processing unit 109, the communication unit 101 is additionally provided with two more functions.

The first of the two additional functions is to receive a content message from another communication terminal and hand over the substantial data and content ID of the content to the application processing unit 109.

The second of the two additional functions is to generate a content message from a content ID and substantial data that are received from the application processing unit 109 and transmit the generated content message to a specified communication terminal.

[Explanation of Operation]

In the following description, assuming that, under an assumed scenario illustrated in FIG. 1, when the communication terminals A and B pass each other, the communication terminal B detects a content held duplicately by the communication terminal B itself and the communication terminal A, an operation of the present example embodiment will be described.

Figure 4:
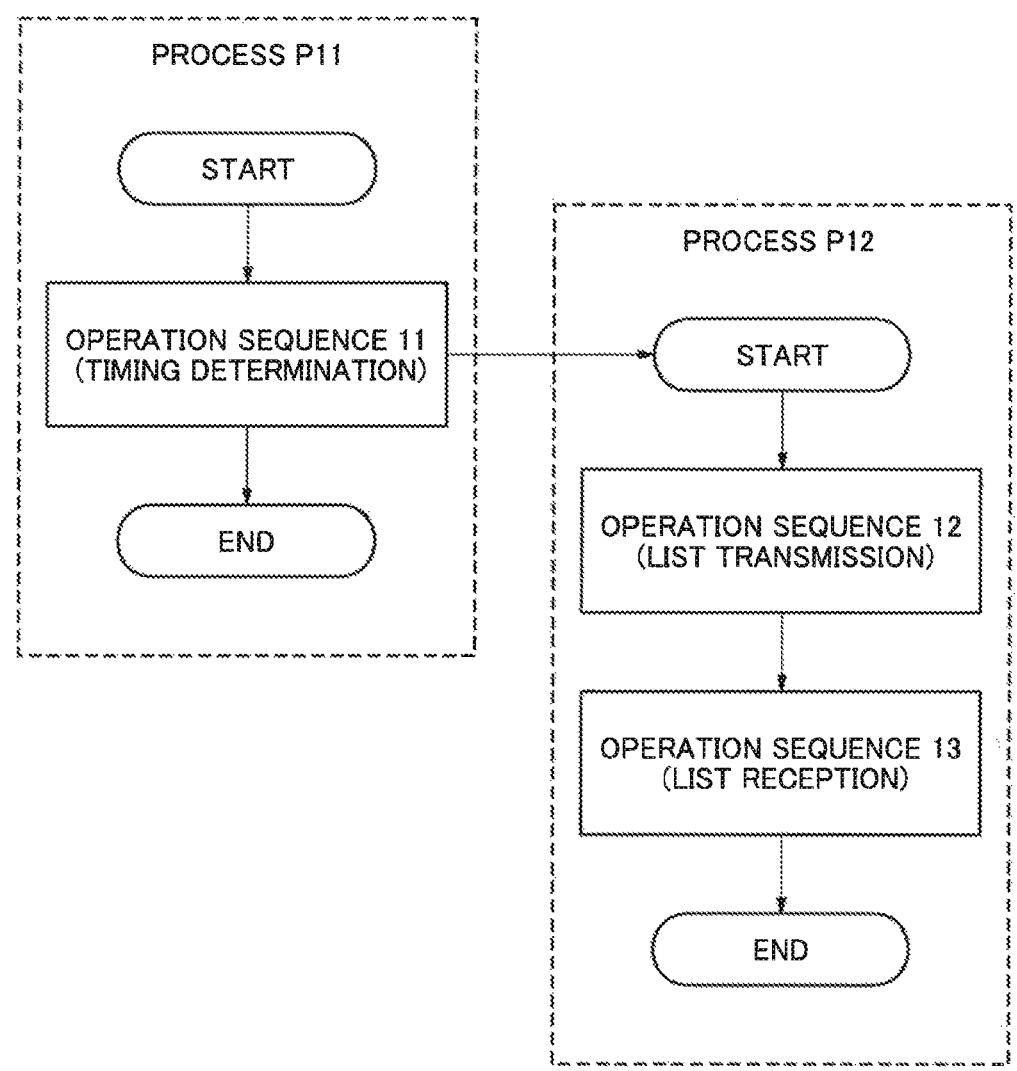
FIG. 4 is a flowchart illustrating an entire operation of the first example embodiment.

An entire operation sequence of the present example embodiment is illustrated in FIG. 4. All operations in FIG. 4 are roughly divided into a "process P11" that represents a flow of successive steps until determining a transmission timing of a content list and a "process P12" that represents a flow of successive steps that takes place from a start time of content list transmission.

The process P11 is made up of an operation sequence (an operation sequence 11 in FIG. 4) for determining a content list transmission timing, and details of the operation sequence 11 will be described in FIG. 5A. It does not matter at which timing the operation sequence is performed. The present example embodiment is effective regardless of whether the operation sequence is performed periodically or unperiodically.

Figure 5A:
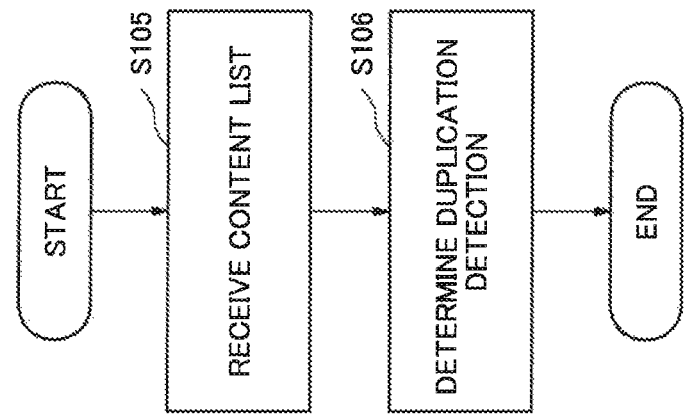
FIGS. 5A, 5B, and 5C are a flowchart illustrating an operation of content list transmission timing determination, a flowchart illustrating an operation of content list transmission, and a flowchart illustrating an operation of content list reception, respectively.

As illustrated in FIG. 5A, operation S101 acquires the number of contents in the content DB of the terminal itself. This operation is an operation in which the content list transmission timing determination unit 104 in FIG. 2A acquires the number of contents from the content DB 102.

Operation S102 determines a content list transmission timing, based on the number of contents acquired in operation S101. The operation is performed by the content list transmission timing determination unit 104 in FIG. 2A. The content list transmission timing based on the number of contents is calculated based on any criterion of the "probability", the "interval time", and the "back-off time" by use of any of the formulae (4) to (7) in the afore-described explanation of configuration.

The process P12 in FIG. 4 is an operation sequence performed from a time when transmission of a content list is started at a content list transmission timing determined in the process P11. The process P12 is made up of an operation sequence (an operation sequence 12 in FIG. 4) in which a content list message is transmitted and an operation sequence (an operation sequence 13 in FIG. 4) in which another communication terminal receives the content list message.

Figure 5B:
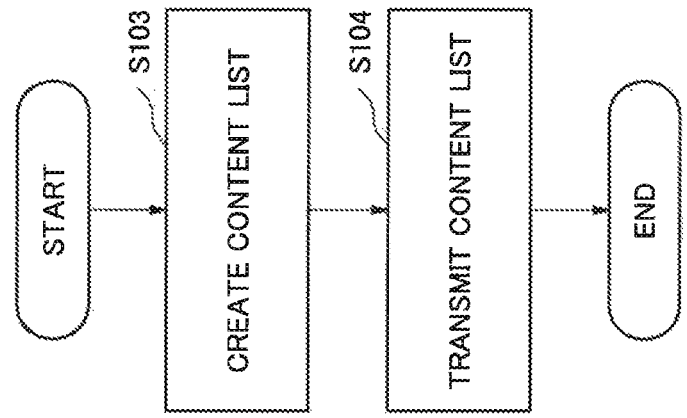

Details of the operation sequence 12 are as illustrated in FIG. 5B. Operation S103 acquires a content list of a held content(s) from inside the content DB of the terminal itself. This operation is an operation in which the content list transmitting and receiving unit 103 in FIG. 2A acquires a list of a content ID(s) from the content DB 102.

Operation S104 transmits the content list acquired in operation S103 to an arbitrary communication terminal. A transmission destination of the content list may be selected at random or a plurality of transmission destinations may be selected out of known communication terminals in the network in advance. This operation is performed by the content list transmitting and receiving unit 103 in FIG. 2A handing over a transmission request of a content list addressed to an arbitrary communication terminal to the communication unit 101 and the communication unit 101 generating a content list message from the content list and the terminal identifier of the terminal itself and transmitting the generated content list message to the arbitrary communication terminal.

Figure 5C:
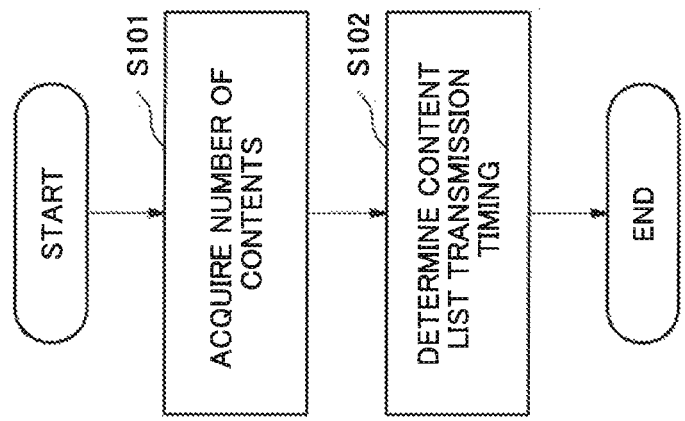

Details of the operation sequence 13 are as illustrated in FIG. 5C.

In operation S105, a communication terminal receives a content list message that another communication terminal transmitted. This operation is performed by the communication unit 101 in FIG. 2A.

Operation S106 compares a content list in the received content list message with a held content list of the terminal itself and detects a duplicate content. In FIG. 2A, the operation sequence 13 is equivalent to a sequence in which the content list transmitting and receiving unit 103 receives a received content list from the communication unit 101, acquires a content list of the terminal itself from the content DB 102, and, by comparing the content lists with each other, detects a duplicate content.

An entire operation in the example in FIG. 1A that is performed through performance of the above respective operations will be described. It is assumed that, on this occasion, content holding statuses at the communication terminals A and B are in accordance with FIG. 1B.

First, each of the communication terminals A and B independently acquires the number of contents in the communication terminal itself (operation S101) and calculates a content list transmission timing (operation S102). It is assumed that, since, at this time, the communication terminal A holds a smaller number of contents than the communication terminal B, a content list transmission timing calculated by the communication terminal A is earlier than one calculated by the communication terminal B.

The communication terminal A, which has an earlier content list transmission timing, generates a content list of held contents from the content DB in the communication terminal A itself (operation S103) and transmits the content list to an arbitrary communication terminal (operation S104). In order to simplify the description, it is assumed that the content list is transmitted to all communication terminals (broadcast).

The communication terminal B receives the content list that the communication terminal A transmits (operation S105) and, by comparing the received content list with a list of held contents in the content DB in the communication terminal B itself, detects that only a content having a content ID C3 is a duplicate content (operation S106).

Consequently, in this example, the communication terminal A transmits a content list including the content IDs of two contents held by the communication terminal A itself first, and the communication terminal B, which receives the transmitted content list, detects the content having the content ID C3, which is a duplicate content. The above operation enables either of communication terminals that have established communication therebetween to detect a duplicate held content with a low load.

Load required for one of the communication terminals to detect a duplicate held content when no example embodiment of the present invention was used was indicated by the formula (1). When the present example embodiment is employed, since the content list message having a smaller message size of the content list messages having message sizes $SVsize_A$ and $SVsize_B$ is transmitted, a control load Load1 is calculated by the formula below.

$$Load1 = SVsize_A \quad\quad (8)$$

Accordingly, the control load is reduced when compared with the formula (1).

Second Example Embodiment

Next, an information sharing method according to a second example embodiment of the present invention will be described. In the second example embodiment, a method for detecting a duplicate held content in a communication terminal that has a proximity detection function for detecting a passing proximate communication terminal will be described. An assumed scenario is similar to that in the first example embodiment.

[Explanation of Configuration]

Figure 6:
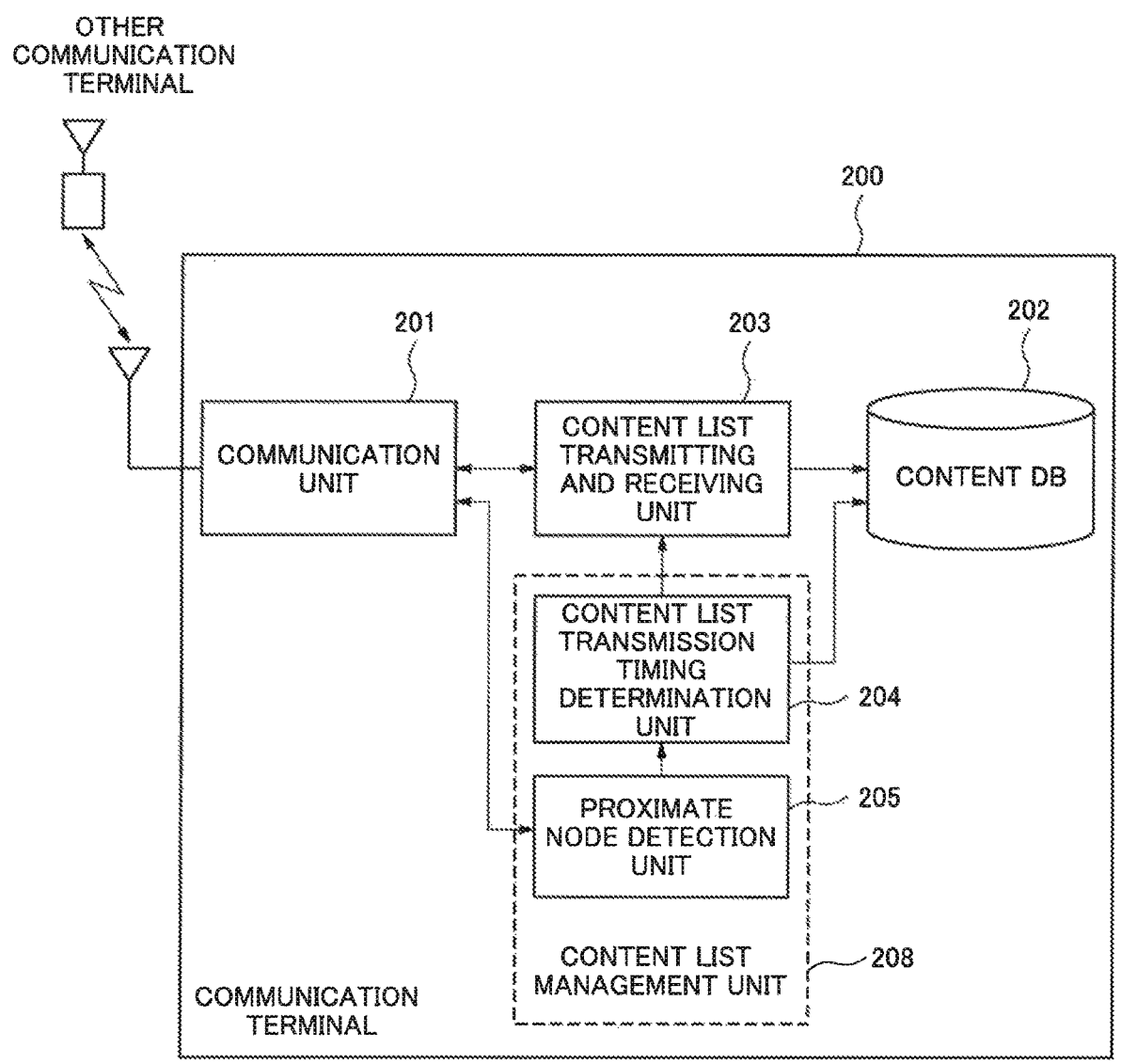
FIG. 6 is a functional block diagram illustrating a communication terminal of a second example embodiment.

In FIG. 6, a configuration of a communication terminal 200 according to a second example embodiment of the present invention that communicates with another communication terminal is illustrated. The configuration illustrated in FIG. 6 is almost the same as the configuration of the first example embodiment of the present invention.

The communication terminal 200 of the present example embodiment includes a communication unit 201, a content DB 202 that holds a content(s), and a content list transmitting and receiving unit 203 that performs transmission/reception processing of a content list. The communication terminal 200 further includes a content list transmission timing determination unit 204 that determines a transmission timing of a content list.

The communication unit 201 and the content DB 202 in FIG. 6 correspond to the communication unit 101 and the content DB 102 in the first example embodiment, respectively. The content list transmitting and receiving unit 203 and the content list transmission timing determination unit 204 correspond to the content list transmitting and receiving unit 103 and the content list transmission timing determination unit 104 in the first example embodiment, respectively. In the second example embodiment, a content list management unit 208 newly includes a proximate node detection unit 205. Note that, as illustrated in FIG. 3 in the first example embodiment, the communication terminal 200 may also include an application processing unit in the second example embodiment. Since the configurations and operations of these components are the same as those in the first example embodiment, a description thereof will be omitted.

The content list management unit 208 includes the content list transmission timing determination unit 204 and the proximate node detection unit 205 in the second example embodiment. The content list management unit 208 has a function of instructing the content list transmitting and receiving unit 203 to transmit a content list at a calculated transmission timing.

The communication unit 201 is provided with two functions in addition to the functions that the communication unit 101 has.

The first of the two functions is a function of receiving a Hello message from another communication terminal and handing over the Hello message to the proximate node detection unit 205. A Hello message in the present example embodiment is a message including at least the terminal identifier of a Hello message transmission source communication terminal. In the subsequent description, it is assumed that a Hello message is transmitted in a broadcast manner. However, the present example embodiment is effective even when a Hello message is not transmitted in a broadcast manner. That is, the destination of a Hello message may be a randomly selected communication terminal, a selected plurality of communication terminals (multicast), or all communication terminals (broadcast).

The second of the two functions is a function of receiving a Hello message transmission instruction from the proximate node detection unit 205, generating a Hello message including the terminal identifier of the terminal itself, and transmitting the generated Hello message in a broadcast manner.

Since the content DB 202 is similar to the content DB 102, a description thereof will be omitted.

Since the content list transmitting and receiving unit 203 is similar to the content list transmitting and receiving unit 103, a description thereof will be omitted. A Hello message transmission source communication terminal that is received from the content list transmission timing determination unit 204 may be specified as a transmission destination of a content list.

The content list transmission timing determination unit 204 has a function that is different from the functions that the content list transmission timing determination unit 104 has. The function is to update a transmission timing of a content list when receiving a proximate node detection notification and the terminal identifier of a Hello message transmission source communication terminal from the proximate node detection unit 205.

Although, in the first example embodiment, the content list transmission timing update may be performed anytime, in the second example embodiment, the content list transmission timing update is performed at a timing when a Hello message from another communication terminal is received. Since a calculation method of a transmission timing of a content list is the same as that employed by the content list transmission timing determination unit 104, a description thereof will be omitted. In addition, when a content list transmission instruction is handed over to the content list transmitting and receiving unit 203, the terminal identifier of a Hello message transmission source communication terminal may be handed over.

The proximate node detection unit 205 is provided with two functions.

The first of the two functions is to receive a Hello message from the communication unit 201 and hand over a proximate node detection notification and the terminal identifier of a Hello message transmission source communication terminal to the content list transmission timing determination unit 204.

The second of the two functions is to output a Hello message transmission instruction to the communication unit 201 at a periodic time interval. Note that the present example embodiment is effective even when the output of a Hello message transmission instruction is not performed at a periodic time interval.

[Explanation of Operation]

In the following description, assuming that, under an assumed scenario in FIG. 1, when communication terminals A and B pass each other, the communication terminal B detects a content held duplicately by the communication terminal B itself and the communication terminal A, an operation of the present example embodiment will be described.

Figure 7:
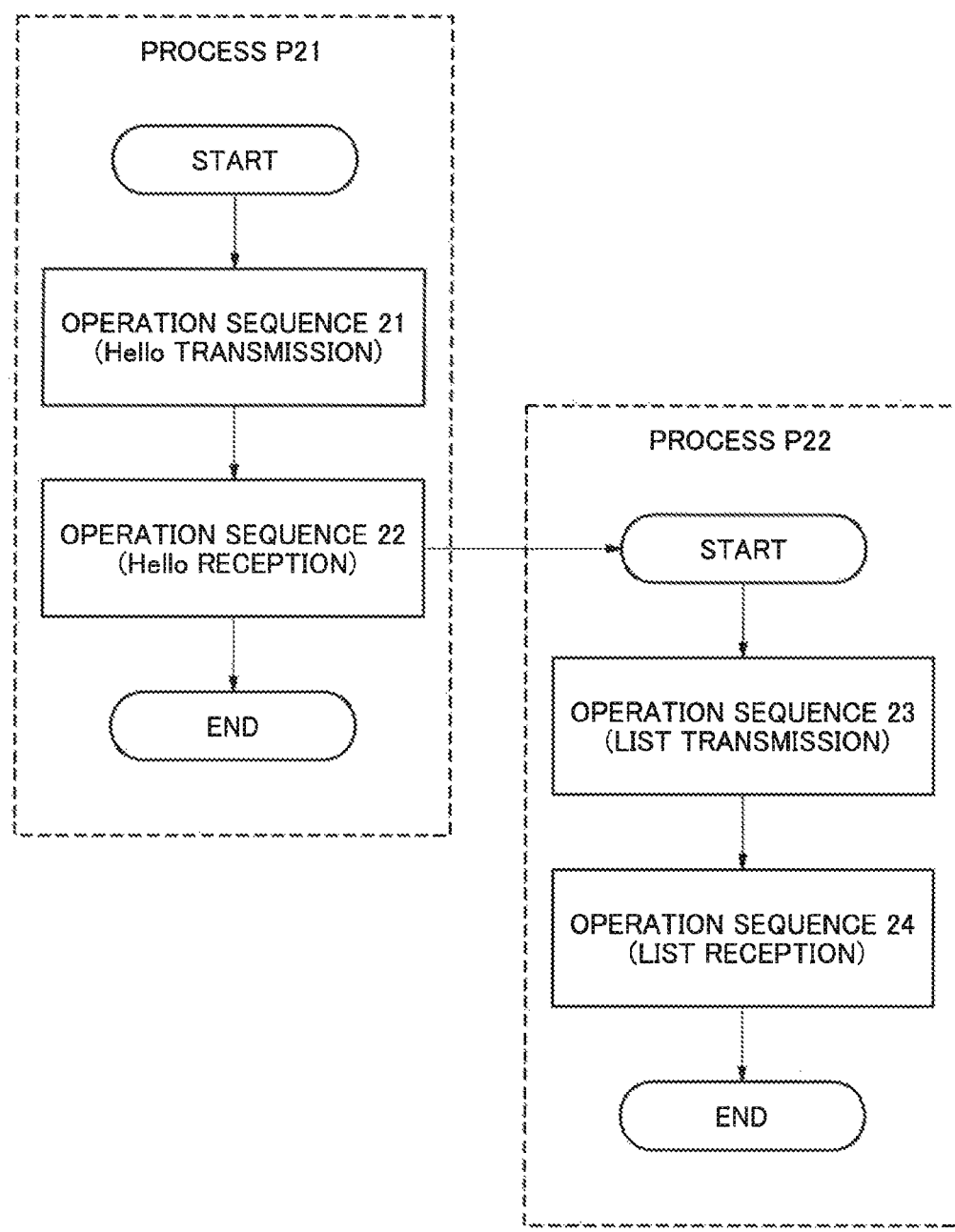
FIG. 7 is a flowchart illustrating an entire operation of the second example embodiment.

An entire operation sequence of the second example embodiment is illustrated in FIG. 7. All operations in FIG. 7 are roughly divided into a "process P21" that represents a flow of successive steps until determining a transmission timing of a content list and a "process P22" that represents a flow of successive steps that takes place from a start time of content list transmission.

Figure 8A:
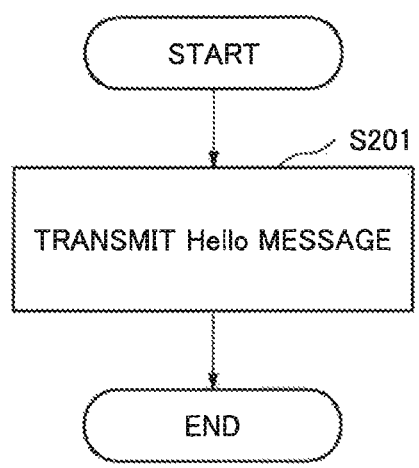
FIGS. 8A and 8B are a flowchart illustrating an operation of Hello message transmission and a flowchart illustrating an operation of Hello message reception and content list transmission timing determination, respectively.

The process P21 is operation sequences (operation sequences 21 and 22 in FIG. 7) for determining a content list transmission timing, and details of the respective operation sequences will be described in FIGS. 8A and 8B. The operation sequence 21 is an operation of transmitting a Hello message and is as illustrated in FIG. 8A.

Operation S201 is performed at a periodic time interval and generates and transmits a Hello message including the communication terminal identifier of the terminal itself to other communication terminals, specifying destinations in a broadcast manner. The above operation is performed by the proximate node detection unit 205 in FIG. 6 outputting a Hello message transmission instruction to the communication unit 201 and the communication unit 201 transmitting a Hello message including the terminal identifier of the terminal itself in a broadcast manner.

Figure 8B:
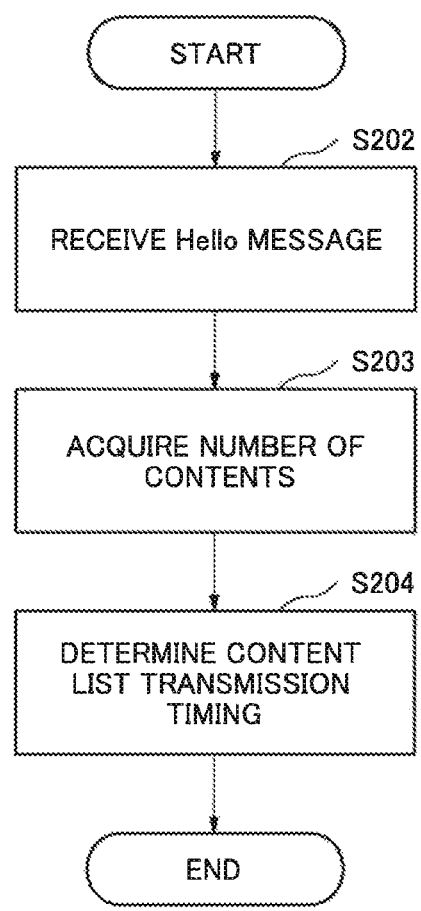

The operation sequence 22 is an operation of receiving a Hello message and is as illustrated in FIG. 8B. Although, in the first example embodiment, determination of a content list transmission timing may be performed anytime, in the second example embodiment, the determination of a content list transmission timing is performed when a Hello message is received.

Operation S202 receives a Hello message from another communication terminal. Operation S202 includes an operation in which, in FIG. 6, the communication unit 201 receives a Hello message from another communication terminal and the terminal identifier of a communication terminal that is the Hello message transmission source is handed over to the proximate node detection unit 205. Operation S202 further includes an operation in which the proximate node detection unit 205 outputs a proximate node detection notification and the terminal identifier of a communication terminal that is the Hello message transmission source to the content list transmission timing determination unit 204.

Since operations S203 and S204 are the same as operations S101 and S102 in FIG. 5A in the first example embodiment, respectively, a description thereof will be omitted. The process P22 is an operation sequence performed from a time when transmission of a content list is started at a content list transmission timing determined in the process P21. The process P22 is made up of an operation sequence (an operation sequence 23 in FIG. 7) in which a content list is transmitted and an operation sequence (an operation sequence 24 in FIG. 7) in which another communication terminal receives the content list. Since the operation sequences 23 and 24 are the same as the operation sequences 12 and 13 in the first example embodiment, respectively, a description thereof will be omitted.

An entire operation of the second example embodiment in an example in FIG. 1A that is performed through performance of the above respective operations will be described. It is assumed that, on this occasion, content holding statuses at the communication terminals A and B are in accordance with FIG. 1B.

First, each of the communication terminals A and B independently transmits a Hello message including the communication terminal identifier of the communication terminal periodically (operation S201). It is assumed that, at time t2, the communication terminal A receives a Hello message from the communication terminal B (operation S202). In so doing, the communication terminal A acquires the number of held contents in the communication terminal A itself (operation S203) and determines a transmission timing of a content list of the communication terminal A itself (operation S204). When receiving a Hello message from the communication terminal A, the communication terminal B also determines a transmission timing of a content list by use of a similar procedure. Since a transmission timing is calculated in accordance with, for example, any of the formulae (4) to (7), a communication terminal holding a smaller number of contents transmits a content list message first with a higher probability (operations S103 and S104 in FIG. 5B). In the case of this example, the communication terminal A is to transmit a content list message first with a higher probability.

The communication terminal B performs an operation for content list reception illustrated in FIG. 5C. That is, the communication terminal B receives the content list message, which the communication terminal A transmits, (operation S105 in FIG. 5C) and, by comparing the received content list with a list of held contents in the content DB 202 in the communication terminal B itself, detects that only a content having a content ID C3 is a duplicate content (operation S106 in FIG. 5C).

Consequently, in this example, the communication terminal A transmits a content list including the content IDs of two contents held by the communication terminal A itself first with a higher probability, and the communication terminal B, which receives the transmitted content list message, detects the content having the content ID C3, which is a duplicate content. The above operation enables either of communication terminals that have established communication therebetween to detect a duplicate held content with a low load.

Third Example Embodiment

Next, an information sharing method according to a third example embodiment of the present invention will be described. In the third example embodiment, an example embodiment in the case where, by incorporating the number of held contents in a communication terminal into a Hello message, the number of held contents in a communication terminal with which communication has been established can be grasped will be described. In particular, a method for detecting duplication at a communication terminal that has a proximity detection function for detecting a passing proximate communication terminal will be described. An assumed scenario is similar to that in the first example embodiment.

[Explanation of Configuration]

Figure 9A:
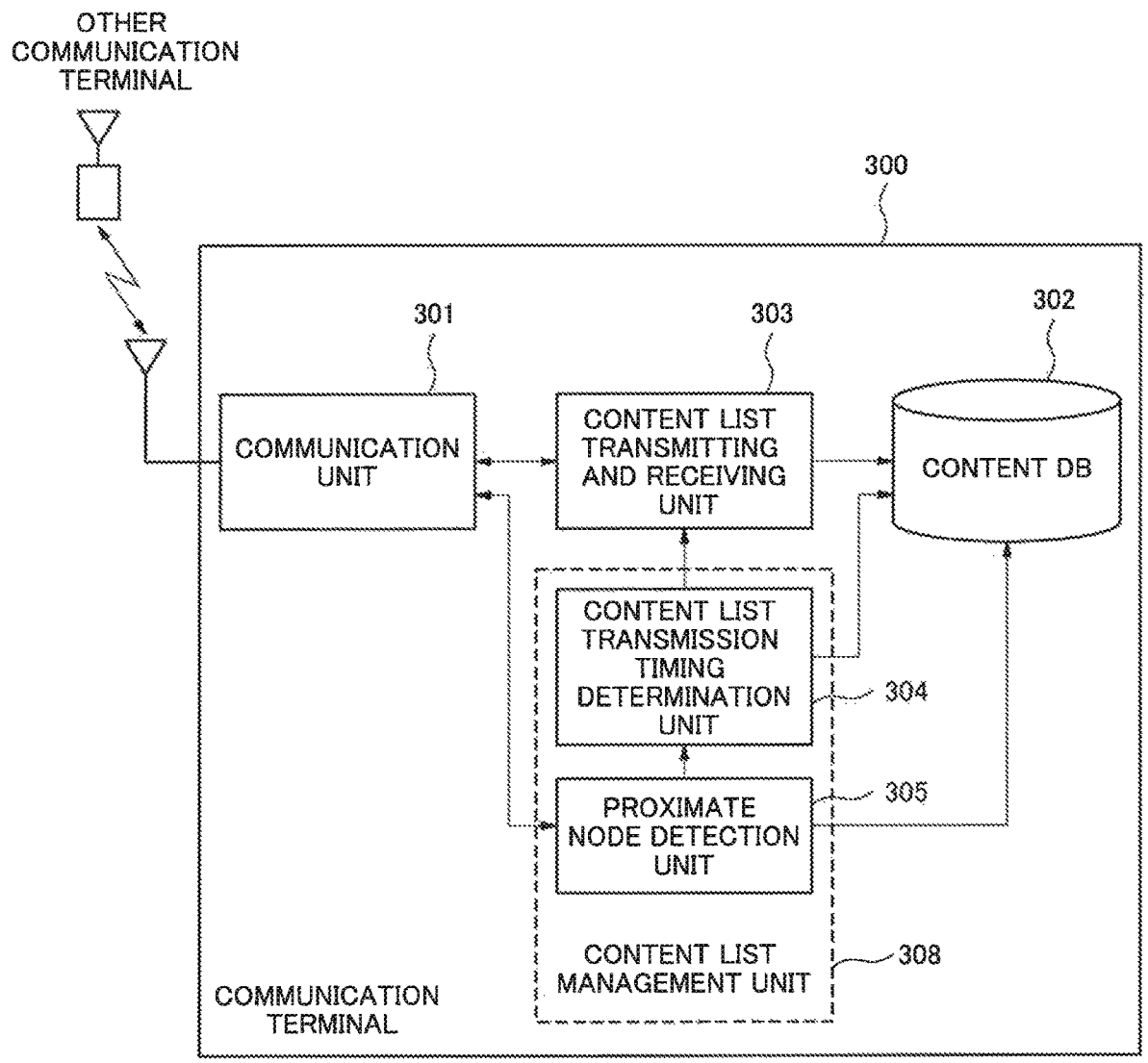
FIGS. 9A and 9B are a functional block diagram of a communication terminal of a third example embodiment and an example of a Hello message including the number of held contents, respectively.
Figure 9B:
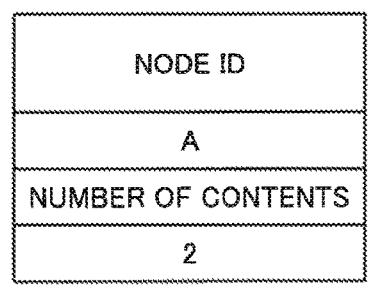

In FIG. 9A, a configuration of a communication terminal 300 according to the third example embodiment of the present invention that communicates with another communication terminal is illustrated. In FIG. 9B, an example of a Hello message including the number of held contents is illustrated. The configuration illustrated in FIG. 9A is almost the same as that of the communication terminal 200 according to the second example embodiment of the present invention.

The communication terminal 300 of the present example embodiment includes a communication unit 301, a content DB 302 that holds a content(s), and a content list transmitting and receiving unit 303 that performs transmission/reception processing of a content list. The communication terminal 300 further includes a content list transmission timing determination unit 304 that determines a transmission timing of a content list and a proximate node detection unit 305.

The communication unit 301, the content DB 302, and the content list transmitting and receiving unit 303 in FIG. 9 correspond to the communication unit 201, the content DB 202, and the content list transmitting and receiving unit 203 in the second example embodiment, respectively. The content list transmission timing determination unit 304 and the proximate node detection unit 305 in FIG. 9 correspond to the content list transmission timing determination unit 204 and the proximate node detection unit 205 in the second example embodiment, respectively. Note that, as illustrated in FIG. 3 in the first example embodiment, the communication terminal 300 may also include an application processing unit in the third example embodiment. Since the configurations and operations of these components are the same as those in the first example embodiment, a description thereof will be omitted.

The content list management unit 308, as with the second example embodiment, includes the content list transmission timing determination unit 304 and the proximate node detection unit 305. The content list management unit 308 has a function of instructing the content list transmitting and receiving unit 303 to transmit a content list at a calculated transmission timing.

Since the communication unit 301 has the same function as the communication unit 201, a description thereof will be omitted. Since the content DB 302 has the same function as the content DB 202, a description thereof will be omitted. Since the content list transmitting and receiving unit 303 has the same function as the content list transmitting and receiving unit 203, a description thereof will be omitted.

The content list transmission timing determination unit 304 of the present example embodiment has the function that the content list transmission timing determination unit 204 has. In addition to the function, the content list transmission timing determination unit 304 has a function of determining a transmission timing of a content list, based on a comparison result between the number of held contents in another communication terminal, which is received from the proximate node detection unit 305, and the number of held contents in the terminal itself.

The number of held contents in the terminal itself is acquired from the content DB 302. The function of determining a transmission timing of a content list may be performed when the transmission timing determination unit 304 is notified of the number of held contents in another communication terminal by the proximate node detection unit 305 or may be performed independently of the proximate node detection unit 305. A transmission timing of a content list is, as with the first example embodiment, calculated based on any of three criteria, "probability", "back-off time", and "interval time". When it is assumed that the number of held contents in a communication terminal A and the number of held contents in a communication terminal B are denoted by $X_A$ and $X_B$, respectively, the respective calculation methods of a transmission timing in the communication terminal A are as follows.

First, when the "probability" is employed for calculating a transmission timing of a content list, the content list transmission timing determination unit 304, every time calculating a transmission timing of a content list, outputs a content list transmission instruction to the content list transmitting and receiving unit 303 with a probability p ($0 \leq p \leq 1$). For example, the probability p is calculated in accordance with the formula (9) below:

$$\text{if}(X_A > X_B) p = 0 \quad (9)$$

else p=1

Alternatively, the probability p is calculated using a ratio value "$X_B/X_A$" between the numbers of held contents in accordance with the formula (10) below:

$$p = g \times \left(\frac{X_B}{X_A}\right)^a \quad (10)$$

Still alternatively, the probability p is calculated using a difference value "$X_B - X_A$" between the numbers of held contents in accordance with the formula (11) below:

$$p = h \times (X_B - X_A)^b \quad (11)$$

In the above formulae, it is assumed that g, h, a, and b are constants.

Next, when the "interval time" is employed for calculating a transmission timing of a content list, the content list transmission timing determination unit 304 outputs a content list transmission instruction to the content list transmitting and receiving unit 303 at every interval time $t_{update}$. The calculation of a transmission timing of a content list may be performed independently of operation of a timer counting the interval time. For example, $t_{update}$ is updated in accordance with the formula (12), (13), or (14) below.

$$t_{update} = t_{previous} \times \frac{X_{B\_previous} - X_{A\_previous}}{X_{B\_update} - X_{A\_update}} \quad (12)$$

In the above formula, $t_{previous}$ denotes an interval time before update, and the number of held contents in the communication terminal A itself at the previous update and the number of contents at present are denoted by $X_{A\_previous}$ and $X_{A\_update}$, respectively. For the communication terminal B, $X_{B\_previous}$ and $X_{B\_update}$ are also defined in a similar manner. Alternatively, instead of using a previous interval time $t_{previous}$, $t_{update}$ may be calculated independently as described below. For example, $t_{update}$ is calculated using a ratio value "$X_A/X_B$" or a difference value "$X_A - X_B$" between the numbers of held contents in accordance with either of the formulae below:

$$t_{update} = i \times \left(\frac{X_A}{X_B}\right)^c \quad (13)$$

or $$t_{update} = j \times (X_A - X_B)^d \quad (14)$$

In the above formulae, it is assumed that i, j, c, and d are constants.

Last, when the "back-off time" is employed for calculating a transmission timing of a content list, the content list transmission timing determination unit 304 outputs a content list transmission instruction addressed to the content list transmitting and receiving unit 303 $t_{backoff}$(seconds) after the completion of calculation of a transmission timing of a content list. For example, $t_{backoff}$ is calculated using a ratio value "$X_A/X_B$" or a difference value "$X_A - X_B$" between the numbers of held contents in accordance with either of the formulae below.

$$t_{backoff} = k \times \left(\frac{X_A}{X_B}\right)^e \quad (15)$$

$$t_{backoff} = l \times (X_A - X_B)^f \quad (16)$$

In the above formulae, it is assumed that k, l, e, and f are constants.

All the methods are only examples, and any method may be employed as long as the method calculates a transmission timing in such a way that a communication terminal that has a smaller number of contents transmits a content list first.

The proximate node detection unit 305 is provided with two functions.

The first of the two functions is to acquire the number of contents held by the terminal itself from the content DB 302 and request the communication unit 301 to transmit a Hello message (FIG. 9B) including the number of held contents to an arbitrary communication terminal. It is assumed that the function is performed periodically. However, the present invention is effective even when the function is not performed periodically. In addition, information on the number of contents may be transmitted as a message separate from a Hello message.

The second of the two functions is to hand over the number of held contents in another communication terminal, which is included in a Hello message received from the communication unit 301, to the content list transmission timing determination unit 304.

[Explanation of Operation]

In the following description, assuming that, under an assumed scenario in FIG. 1A, when the communication terminals A and B pass each other, the communication terminal B detects a content held duplicately by the communication terminal B itself and the communication terminal A, an operation of the present example embodiment will be described.

Figure 10:
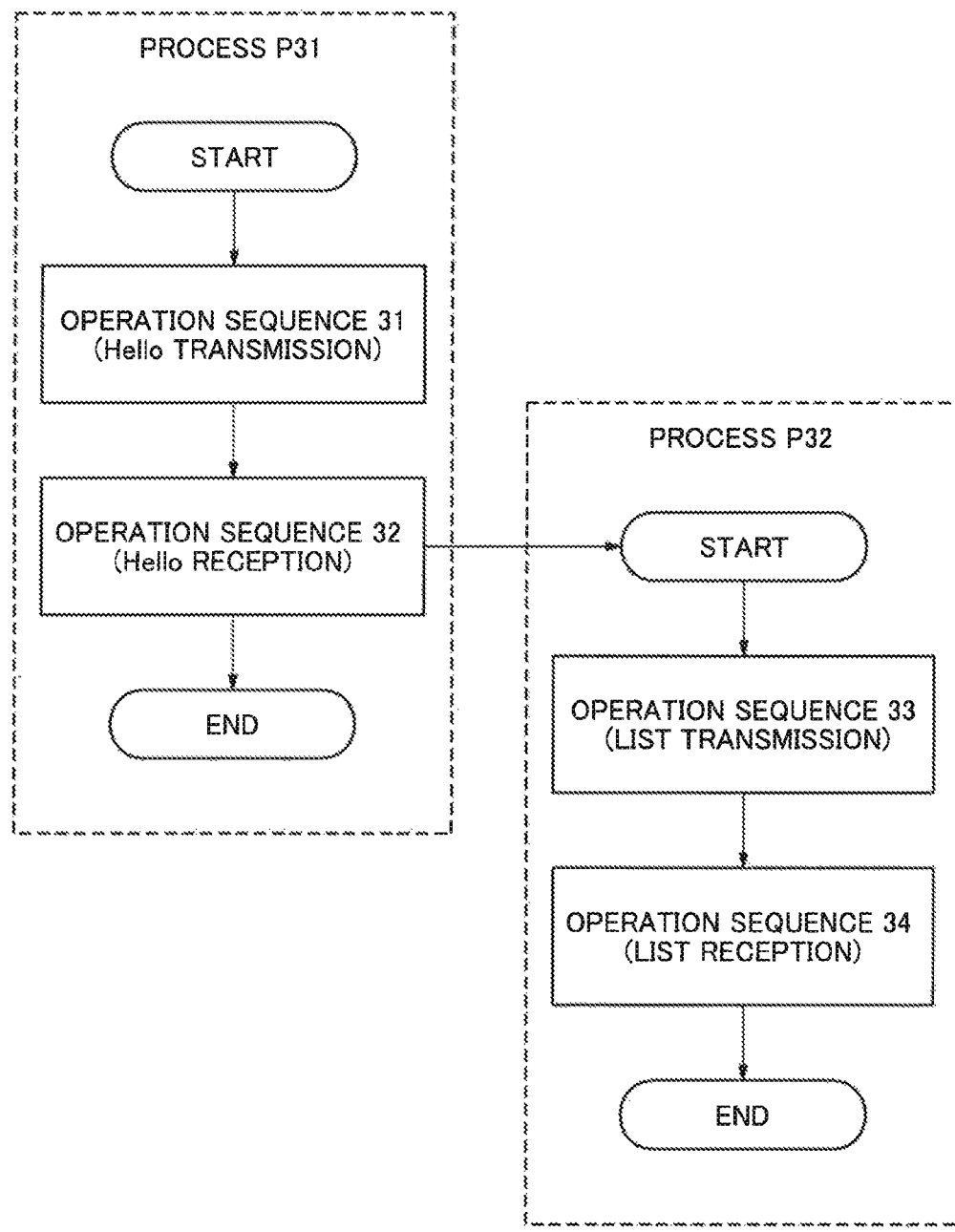
FIG. 10 is a flowchart illustrating an entire operation of the third example embodiment.

An entire operation sequence of the third example embodiment is illustrated in FIG. 10. All operations in FIG. 10 are roughly divided into a "process P31" that represents a flow of successive steps until determining a transmission timing of a content list and a "process P32" that represents a flow of successive steps that takes place from a start time of content list transmission.

The process P31 is operation sequences (operation sequences 31 and 32 in FIG. 10) for determining a content list transmission timing, and details of the respective operation sequences will be described in FIGS. 11A and 11B.

Figure 11A:
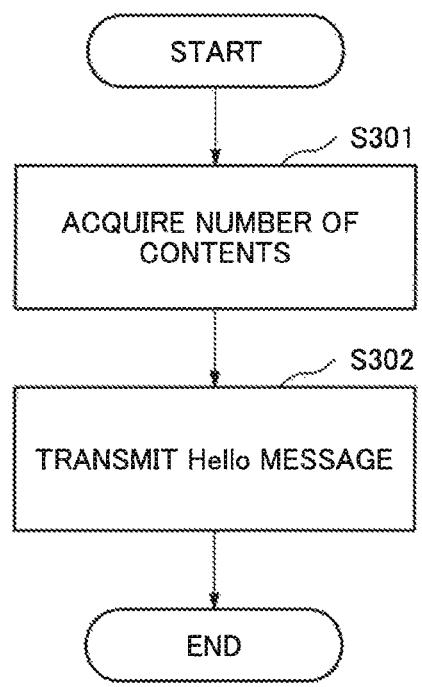
FIGS. 11A and 11B are a flowchart illustrating an operation of Hello message transmission and a flowchart illustrating an operation of Hello message reception, respectively.

The operation sequence 31 is an operation of transmitting a Hello message and is as illustrated in FIG. 11A. Operation S301 acquires, from the content DB in the terminal itself, the number of contents stored in the content DB. The operation is an operation in which, in FIG. 9A, the proximate node detection unit 305 acquires the number of contents from the content DB 302.

Operation S302 transmits a Hello message including the number of held contents in the terminal itself, which is acquired in the above-described operation S301, in a broadcast manner. The operation is an operation in which, in FIG. 9A, the proximate node detection unit 305 requests the communication unit 301 to transmit a Hello message including the acquired number of held contents in the terminal itself. The communication unit 301 transmits a Hello message that, as illustrated in FIG. 9B, includes the number of held contents in a broadcast manner.

Figure 11B:
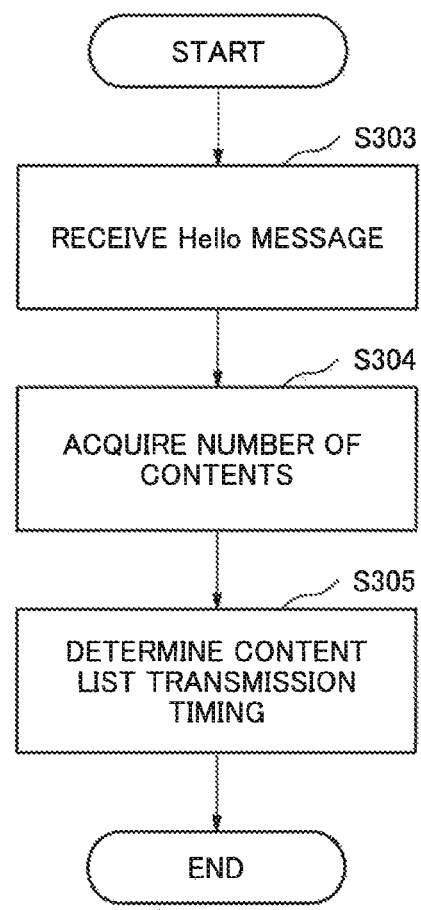

The operation sequence 32 is an operation of receiving a Hello message and is as illustrated in FIG. 11B. Operation S303 is an operation in which a communication terminal receives a Hello message from another communication terminal. In other words, in FIG. 9A, the communication unit 301 receives a Hello message from another communication terminal. The communication unit 301 hands over the received Hello message to the proximate node detection unit 305, and the proximate node detection unit 305 hands over information on the number of contents in the Hello message to the content list transmission timing determination unit 304.

Operation S304 is similar to operation S203 in FIG. 8B. The operation is an operation in which, in FIG. 9A, the content list transmission timing determination unit 304 acquires the number of held contents in the terminal itself from the content DB 302.

Operation S305 determines a transmission timing of a content list by use of the number of contents included in the Hello message received from another communication terminal and the number of held contents in the terminal itself acquired in the above-described operation S304. A transmission timing of a content list is calculated based on any of three criteria, "probability", "back-off time", and "interval time", as described in the first example embodiment. The transmission timing is calculated by use of any of the formulae (9) to (16), which were described in the explanation of the configuration of the third example embodiment. All the methods are only examples, and any method may be employed as long as a transmission timing is calculated in such a way that a communication terminal that has a smaller number of contents transmits a content list first with a higher probability.

The process P32 is an operation sequence performed from a time when transmission of a content list is started at a content list transmission timing determined in the process P31. The process P32 is made up of an operation sequence (an operation sequence 33 in FIG. 10) in which a content list is transmitted and an operation sequence (an operation sequence 34 in FIG. 10) in which another communication terminal receives the content list.

Since the operation sequences 33 and 34 are the same as the operation sequences 12 and 13 in the first example embodiment, respectively, a description thereof will be omitted.

An entire operation of the third example embodiment in an example in FIG. 1A that is performed through performance of the above respective operations will be described. It is assumed that, on this occasion, content holding statuses at the communication terminals A and B are in accordance with FIG. 1B.

First, each of the communication terminals A and B independently acquires the number of held contents in the communication terminal itself from the content DB (operation S301) and transmits a Hello message including the number of held contents and the communication terminal identifier of the communication terminal periodically (operation S302). It is assumed that, at time t2, the communication terminal A receives a Hello message from the communication terminal B (operation S303). In so doing, the communication terminal A acquires the number of held contents in the communication terminal A itself (operation S304) and, based on a comparison result between the acquired number of held contents and the number of held contents in the other communication terminal, determines a transmission timing of a content list of the communication terminal A itself (operation S305). When receiving a Hello message from the communication terminal A, the communication terminal B also determines a transmission timing of a content list by use of a similar procedure. Since a transmission timing is calculated in accordance with, for example, any of the formulae (9) to (16) by use of the numbers of held contents in both communication terminals, a communication terminal having a smaller number of contents transmits a content list message first with a higher probability (operations S103 and S104 in FIG. 5B). In the case of this example, the communication terminal A is to transmit a content list message first with a higher probability.

The communication terminal B receives the content list message, which the communication terminal A transmits, (operation S105 in FIG. 5C) and, by comparing the received content list with a list of held contents in the content DB in the communication terminal B itself, detects that only a content having a content ID C3 is a duplicate content (operation S106 in FIG. 5C).

Consequently, in this example, the communication terminal A transmits a content list message including the content IDs of two contents held by the communication terminal A itself first with a higher probability, and the communication terminal A, which receives the transmitted content list message, detects the content having the content ID C3, which is a duplicate content. The above operation enables either of communication terminals that have established communication therebetween to detect a duplicate held content with a low load.

Fourth Example Embodiment

Next, an information sharing method according to a fourth example embodiment of the present invention will be described. In the fourth example embodiment, an example embodiment in which both communication terminals that have established communication therebetween detect a duplicate content will be described. An assumed scenario is similar to that in the first example embodiment.
[Explanation of Configuration]

Figure 12:
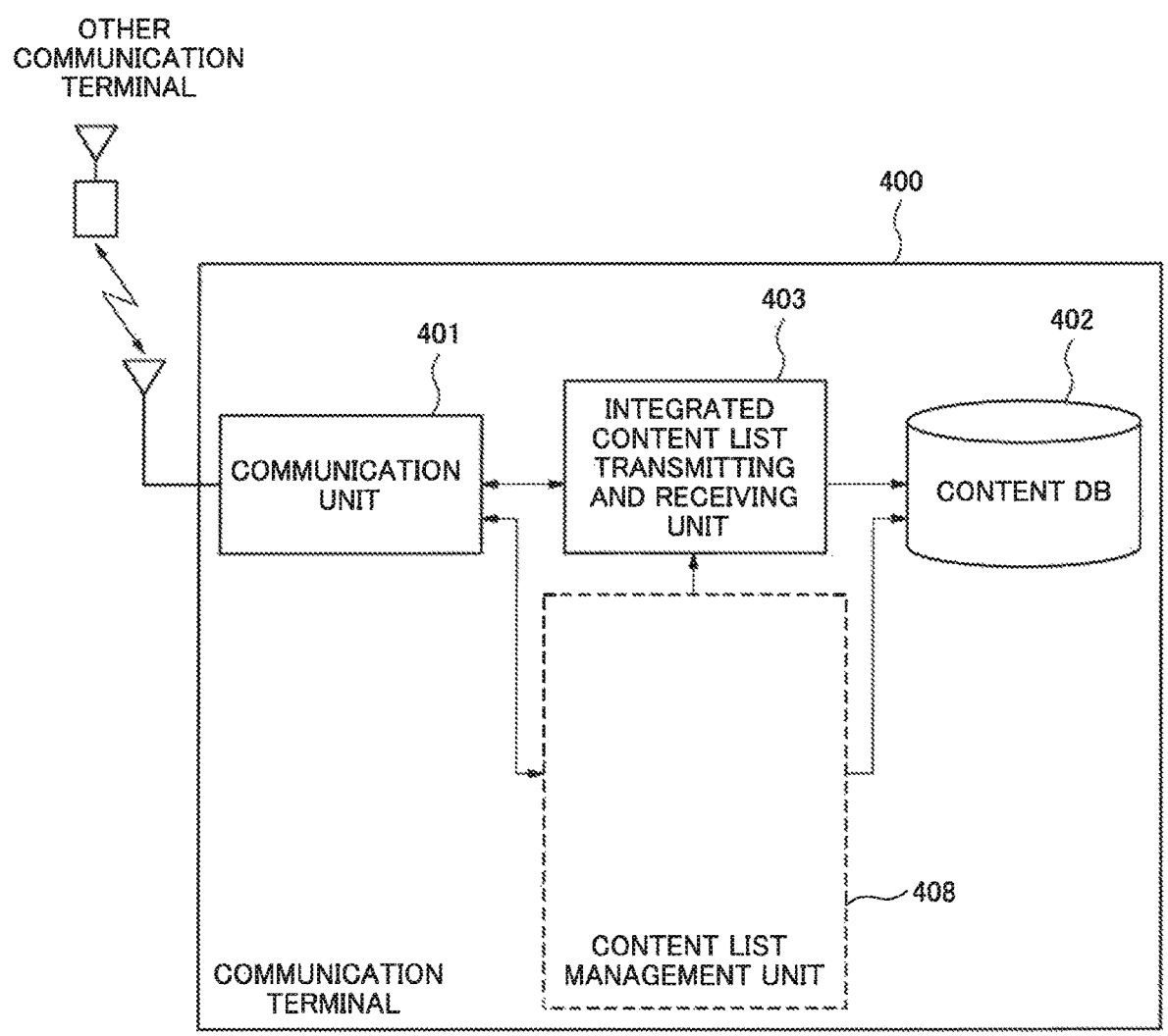
FIG. 12 is a functional block diagram illustrating a communication terminal of a fourth example embodiment.

In FIG. 12, a configuration of a communication terminal 400 according to the fourth example embodiment of the present invention that communicates with another communication terminal is illustrated. The configuration illustrated in FIG. 12 is almost the same as the configurations of communication terminals of the first to third example embodiments.

The communication terminal 400 according to the present example embodiment includes a communication unit 401, a content DB 402 that holds a content(s), an integrated content list transmitting and receiving unit 403, and a content list management unit 408.

The communication unit 401 and the content DB 402 of the present example embodiment correspond to the communication unit 301 and the content DB 302 of the third example embodiment, respectively. The integrated content list transmitting and receiving unit 403 of the present example embodiment corresponds to the content list transmitting and receiving unit 303 of the third example embodiment but has a different function. Note that, as illustrated in FIG. 3 in the first example embodiment, the communication terminal 400 may also include an application processing unit in the fourth example embodiment. Since the configurations and operations of these components are the same as those in the first example embodiment, a description thereof will be omitted.

The content list management unit 408 has a function of instructing the content list transmitting and receiving unit 403 to transmit a content list at a calculated transmission timing. The content list management unit 408 may be replaced by any of the content list management unit 108 in FIG. 2A in the first example embodiment, the content list management unit 208 in FIG. 6 in the second example embodiment, and the content list management unit 308 in FIG. 9A in the third example embodiment.

The communication unit 401 is provided with two functions in addition to the functions that the communication unit 301 has.

The first of the two functions is to generate a duplicate content list message from a duplicate content list that is received from the integrated content list transmitting and receiving unit 403 and the terminal identifier of the terminal itself and transmit the generated duplicate content list message to a specified communication terminal.

The second of the two functions is to hand over a duplicate content list in a duplicate content list message received from another communication terminal and the terminal identifier of a duplicate content list message transmission source terminal to the integrated content list transmitting and receiving unit 403.

The integrated content list transmitting and receiving unit 403 is provided with three functions.

The first of the three functions is to, when receiving a content list transmission instruction from the content list management unit 408, acquire a content list of the terminal itself from the content DB 402 and request the communication unit 401 to transmit the content list to an arbitrary communication terminal.

The second of the three functions is to receive a content list transmitted by another communication terminal from the communication unit 401 and, by comparing the received content list with a content list held by the terminal itself, detect a duplicate content. The second function is also to request the communication unit 401 to transmit a list of a detected duplicate content(s) (a duplicate content list) to a content list message transmission source communication terminal.

The third of the three functions is to receive a duplicate content list and the terminal identifier of a duplicate content list message transmission source communication terminal from the communication unit 401 and detect a duplicate held content held duplicately by the terminal itself and the duplicate content list message transmission source communication terminal.
[Explanation of Operation]

In the following description, assuming that, under an assumed scenario in FIG. 1A, when the communication terminals A and B pass each other, the communication terminal B detects a content held duplicately by the communication terminal B itself and the communication terminal A, an operation of the present example embodiment will be described.

Figure 13:
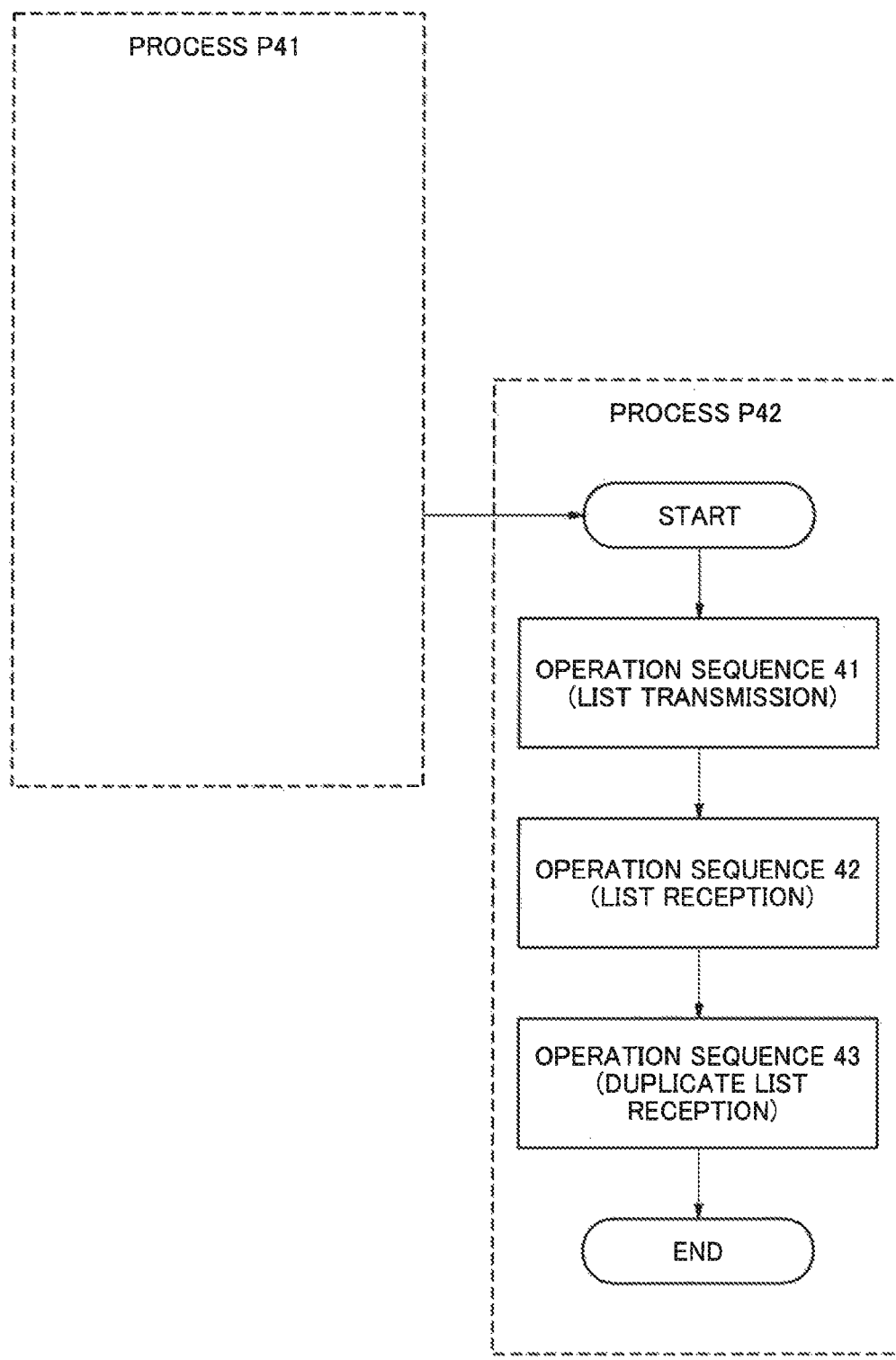
FIG. 13 is a flowchart illustrating an entire operation of the fourth example embodiment.

An entire operation sequence of the fourth example embodiment is illustrated in FIG. 13. All operations in FIG. 13 is roughly divided into a "process P41" that represents a flow of successive steps until determining a transmission timing of a content list and a "process P42" that represents a flow of successive steps that takes place from a start time of content list transmission.

The process P41 is an operation sequence for determining a transmission timing of a content list and may be replaced by any of the process P11 in FIG. 4 in the first example embodiment, the process P21 in FIG. 7 in the second example embodiment, and the process P31 in FIG. 10 in the third example embodiment.

The process P42 is an operation sequence performed from a time when transmission of a content list is started at a content list transmission timing determined in the process P41. The process P42 includes an operation sequence (an operation sequence 41 in FIG. 13) in which a content list message is transmitted and an operation sequence (an operation sequence 42 in FIG. 13) in which another communication terminal receives the content list message. The process P42 further includes an operation sequence (an operation sequence 43 in FIG. 13) of receiving a replied duplicate content list message.

Figure 14A:
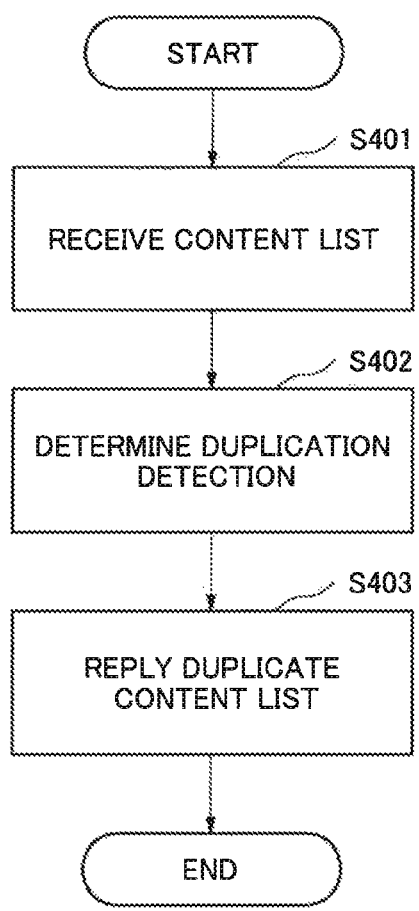
FIGS. 14A and 14B are a flowchart illustrating an operation of content list reception and a flowchart illustrating an operation of duplicate content list reception, respectively.

Since the operation sequence 41 is the same as the operation sequence 33 in FIG. 10 in the third example embodiment, a description thereof will be omitted. The operation sequence 42 is an operation sequence on the occasion of receiving a content list message and is as illustrated in FIG. 14A.

In operation S401, a communication terminal receives a content list message from another communication terminal. In other words, operation S401 is an operation in which, in FIG. 12, the communication unit 401 receives a content list message from another communication terminal and hands over a content list in and the terminal identifier of the transmission source communication terminal of the received content list message to the integrated content list transmitting and receiving unit 403.

Operation S402, by comparing the received content list with a held content list of the terminal itself, detects a duplicate held content. In FIG. 12, the integrated content list transmitting and receiving unit 403 receives the content list from the communication unit 401, acquires a content list of the terminal itself from the content DB 402, and, by comparing the content lists with each other, detects a duplicate content.

Operation S403 is an operation of replying the duplicate held content detected in operation S402 to the content list message transmission source communication terminal. In FIG. 12, operation S403 is an operation in which the integrated content list transmitting and receiving unit 403 requests the communication unit 401 to transmit the duplicate held content to the content list message transmission source communication terminal, and the communication unit 401 transmits a duplicate content message to the destination communication terminal.

Figure 14B:
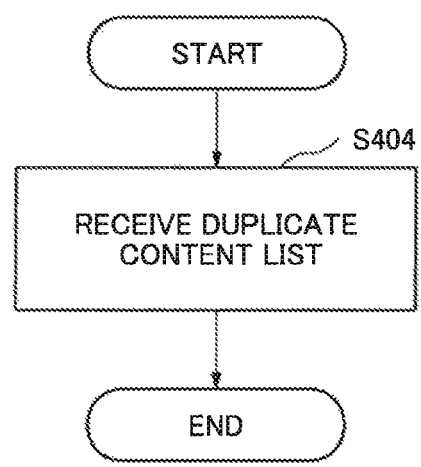

The operation sequence 43 is an operation sequence on the occasion of receiving a duplicate content list message and is as illustrated in FIG. 14B. Operation S404 includes an operation in which the communication unit 401 receives a duplicate content list message received from another communication terminal and hands over a duplicate content list in and the terminal identifier of the transmission source communication terminal of the duplicate content list message to the integrated content list transmitting and receiving unit 403. Operation S404 further includes an operation in which the integrated content list transmitting and receiving unit 403 detects a duplicate held content held duplicately by the terminal itself and another communication terminal.

An entire operation of the fourth example embodiment in an example in FIG. 1A that is performed through performance of the above respective operations will be described. It is assumed that, on this occasion, content holding statuses at the communication terminals A and B are in accordance with FIG. 1B. First, each of the communication terminals A and B independently calculates a transmission timing of a content list (process P41 in FIG. 13). At a calculated transmission timing, a communication terminal having a smaller number of contents transmits a content list message with a higher probability. In the case of this example, the communication terminal A transmits a content list message (the operation sequence 41 in FIG. 13).

The communication terminal B receives the content list message, which the communication terminal A transmits, (operation S401) and, by comparing the received content list with a list of held contents in the content DB in the communication terminal B itself, detects that only a content having a content ID C3 is a duplicate content (operation S402). A duplicate content list message is replied to the communication terminal A, which is the transmission source communication terminal of the content list message (operation S403).

The communication terminal A receives the duplicate content list message, which the communication terminal B transmits, and detects the duplicate content (operation S404).

Consequently, in this example, the communication terminal A transmits a content list including the content IDs of two contents held by the communication terminal A itself first with a higher probability, and the communication terminal B, which receives the transmitted content list message, detects the content having the content ID C3, which is a duplicate content. The communication terminal B replying a list of the duplicate content to the communication terminal A enables the communication terminals A and B to detect a content held duplicately by each other with a low load.

Load required for both communication terminals to detect a duplicate held content when no example embodiment of the present invention was used was indicated by the formula (2). When the fourth example embodiment is employed, since a content list having a smaller size of a content list of the communication terminal A and a content list of the communication terminal B is transmitted first and a duplicate content list is subsequently replied, a control load is calculated as follows.

$$\text{Load2} = \text{SVsize}_A + \text{SVsize}_{A \cap B} \qquad (17)$$

Since $\text{SVsize}_B - \text{Svsize}_{A \cap B} > 0$ holds, the control load is successfully reduced.

Fifth Example Embodiment

Next, an information sharing method according to a fifth example embodiment of the present invention will be described. In the fifth example embodiment, an example embodiment in which one of communication terminals that have established communication therebetween transmits a content not held by the other communication terminal will be described. An assumed scenario is similar to that in the first example embodiment.

[Explanation of Configuration]

Figure 15:
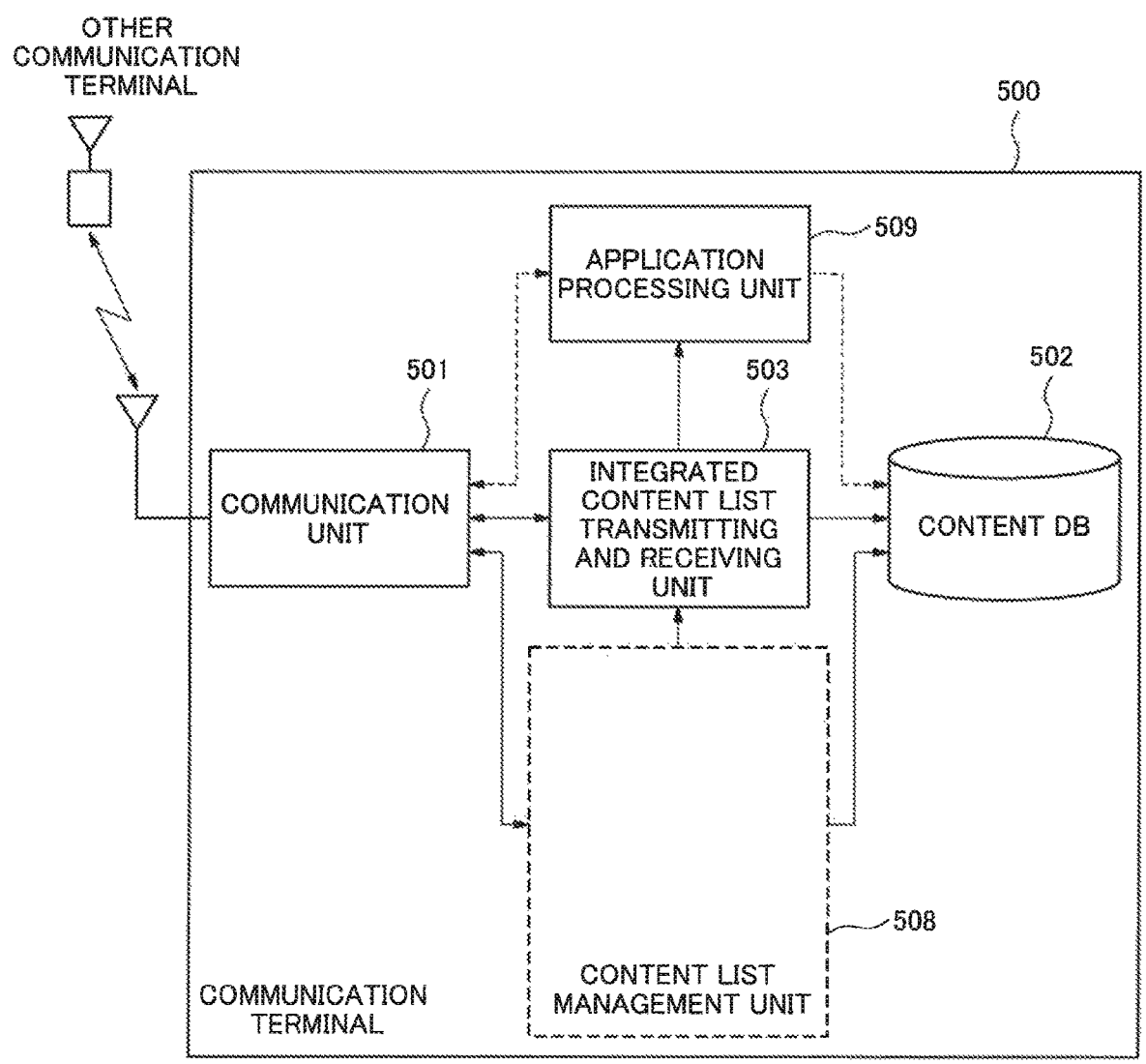
FIG. 15 is a functional block diagram illustrating a communication terminal of a fifth example embodiment.

In FIG. 15, a configuration of a communication terminal 500 according to the fifth example embodiment of the present invention that communicates with another communication terminal is illustrated. The configuration illustrated in FIG. 15 is almost the same as the configuration of the invention according to the fourth example embodiment in FIG. 12.

The communication terminal 500 according to the present example embodiment includes a communication unit 501, a content DB 502 that holds a content(s), an integrated content list transmitting and receiving unit 503, a content list management unit 508, and an application processing unit 509.

The communication unit 501, the content DB 502, and the content list management unit 508 of the present example embodiment correspond to the communication unit 401, the content DB 402, and the content list management unit 408 of the fourth example embodiment, respectively.

Note, however, that, although, in the first to fourth example embodiments, inclusion of the application processing unit 109 in FIG. 3 is optional, the application processing unit 509 is indispensable in the fifth example embodiment.

Since the communication unit 501 has the same function as the communication unit 401, a description thereof will be omitted. Note, however, that, differing from the first to fourth example embodiments, a function of transmitting a content received from the application processing unit 509 to a specified communication terminal and a function of handing over a content message received from another communication terminal to the application processing unit 509 are indispensable.

Since the content DB 502 is similar to the content DB 402, a description thereof will be omitted.

The integrated content list transmitting and receiving unit 503 has almost the same function as that of the integrated content list transmitting and receiving unit 403 of the fourth example embodiment except an operation on the occasion of receiving a duplicate content list in and the terminal identifier of the transmission source communication terminal of a duplicate content list message from the communication unit. The integrated content list transmitting and receiving unit 503 receives a duplicate content list in and the terminal identifier of the transmission source communication terminal of a duplicate content list message from the communication unit 501 and detects a duplicate held content held duplicately by the terminal itself and the duplicate content list message transmission source communication terminal. Subsequently, the integrated content list transmitting and receiving unit 503, in addition to the above operation, outputs the duplicate content list and the terminal identifier of the duplicate content list transmission source communication terminal to the application processing unit 509.

The application processing unit 509 is provided with a function in addition to the function of the application processing unit 109. The function is to receive a duplicate content list in and the terminal identifier of the transmission source communication terminal of a duplicate content list message from the integrated content list transmitting and receiving unit 503. Next, the application processing unit 509 acquires substantial data of a content having a content ID that is not contained in the duplicate content list from the content DB 502. Last, the application processing unit 509 requests the communication unit 501 to transmit the substantial data of the content acquired from the content DB 502 to the transmission source communication terminal of the duplicate content list message.

[Explanation of Operation]

In the following description, an operation of the present example embodiment in which, under an assumed scenario in FIG. 1, when communication terminals A and B pass each other, the communication terminal B detects a content held duplicately by the communication terminal B itself and the communication terminal A will be described.

Figure 16:
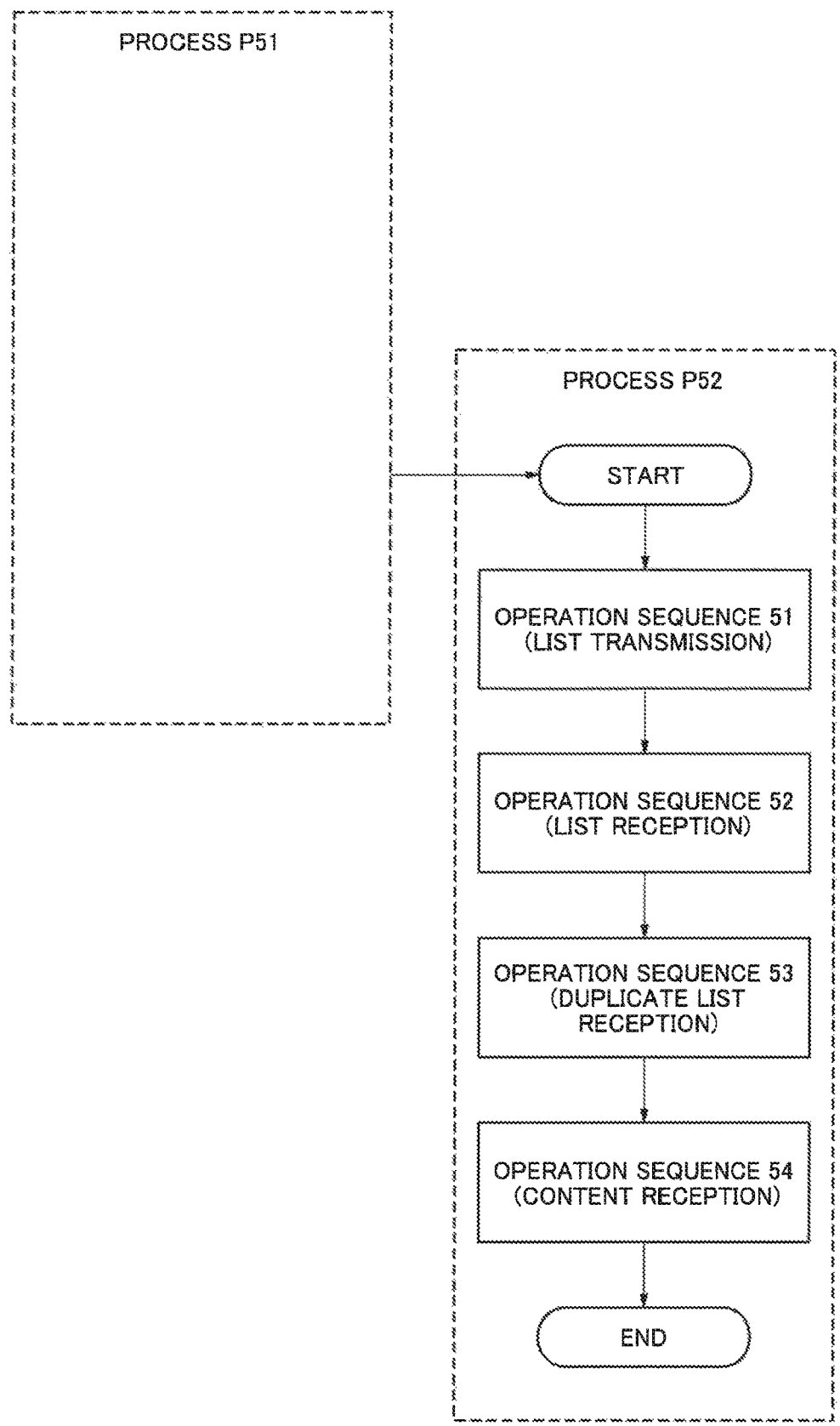
FIG. 16 is a flowchart illustrating an entire operation of the fifth example embodiment.

An entire operation sequence of the fifth example embodiment is illustrated in FIG. 16. All operations are roughly divided into a "process P51" that represents a flow of successive steps until determining a transmission timing of a content list and a "process P52" that represents a flow of successive steps that takes place from a start time of content list transmission.

The process P51 is an operation sequence for determining a transmission timing of a content list and may be replaced by any of the process P11 in FIG. 4 in the first example embodiment, the process P21 in FIG. 7 in the second example embodiment, and the process P31 in FIG. 10 in the third example embodiment.

The process P52 is an operation sequence performed from a time when transmission of a content list is started at a content list transmission timing determined in the process P51. The process P52 includes an operation sequence (an operation sequence 51 in FIG. 16) in which a content list message is transmitted and an operation sequence (an operation sequence 52 in FIG. 16) in which another communication terminal receives the content list message. The process P52 further includes an operation sequence (an operation sequence 53 in FIG. 16) in which a replied duplicate content list message is received and an operation sequence (an operation sequence 54 in FIG. 16) in which the another communication terminal receives an unheld content message.

Figure 17C:
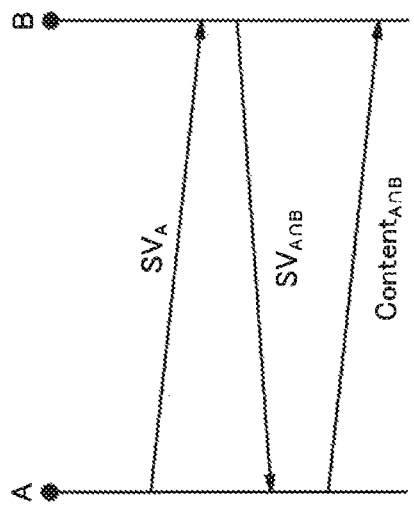
FIGS. 17A, 17B, and 17C are a flowchart illustrating an operation of duplicate content list reception, a flowchart illustrating an operation of content reception, and a sequence diagram illustrating the operation of the content reception, respectively.

Since the operation sequence 51 is the same as the operation sequence 41 in FIG. 13 in the fourth example embodiment, a description thereof will be omitted. Since the operation sequence 52 is the same as the operation sequence 42 in FIG. 13 in the fourth example embodiment, a description thereof will be omitted. The operation sequence 53 is an operation sequence of receiving a content list, and is as illustrated in FIG. 17A.

In operation S501, a communication terminal receives a duplicate content list message from another communication terminal. Operation S501 is an operation in which, in FIG. 15, the communication unit 501 receives a duplicate content list message from another communication terminal and hands over a duplicate content list in and the terminal identifier of the transmission source communication terminal of the received duplicate content list message to the integrated content list transmitting and receiving unit 503.

Operation S502 grasps a duplicate held content from the received duplicate content list message. Operation S502 is an operation in which, in FIG. 15, the integrated content list transmitting and receiving unit 503 hands over the duplicate content list in and the terminal identifier of the transmission source communication terminal of the received duplicate content list message to the application processing unit 509.

Operation S503 transmits an unheld content message to the duplicate content list message transmission source communication terminal. Operation S503 includes an operation in which, in FIG. 15, the application processing unit 509 acquires substantial data of a content that is not contained in the duplicate content list from the content DB 502. Operation S503 further includes an operation in which, in FIG. 15, the application processing unit 509 requests the communication unit 501 to perform transmission to the duplicate content list transmission source communication terminal and the communication unit 501 transmits a message relating to the content (unheld content).

Figure 17B:
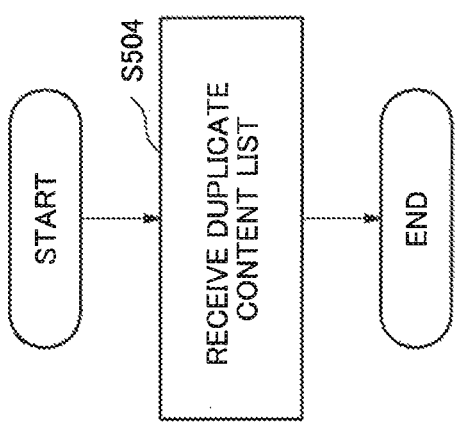
Figure 17A:
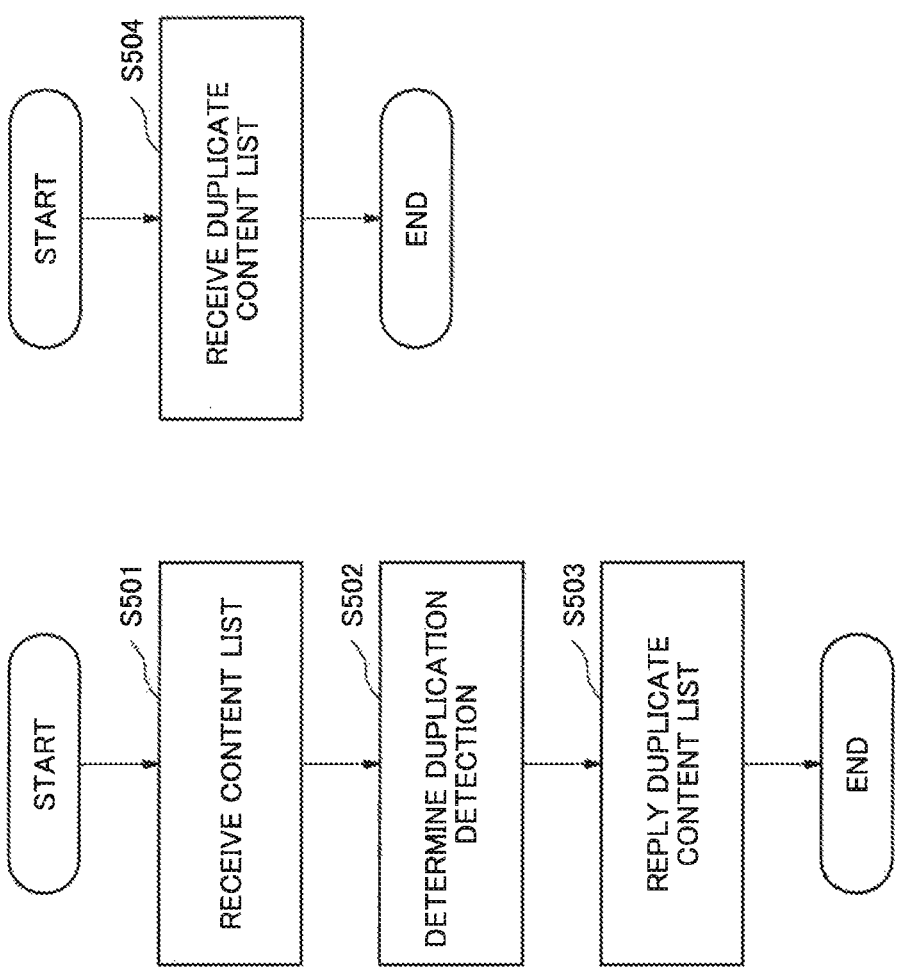
Figure 18A:
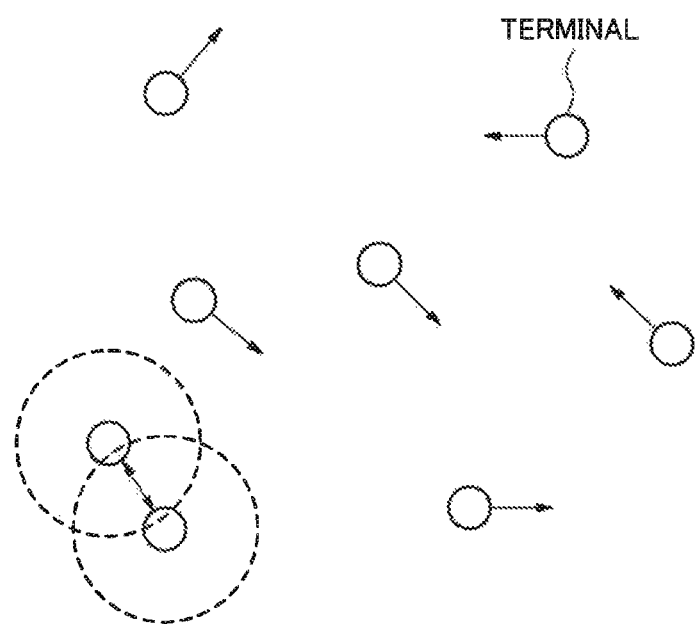
Figure 18B:
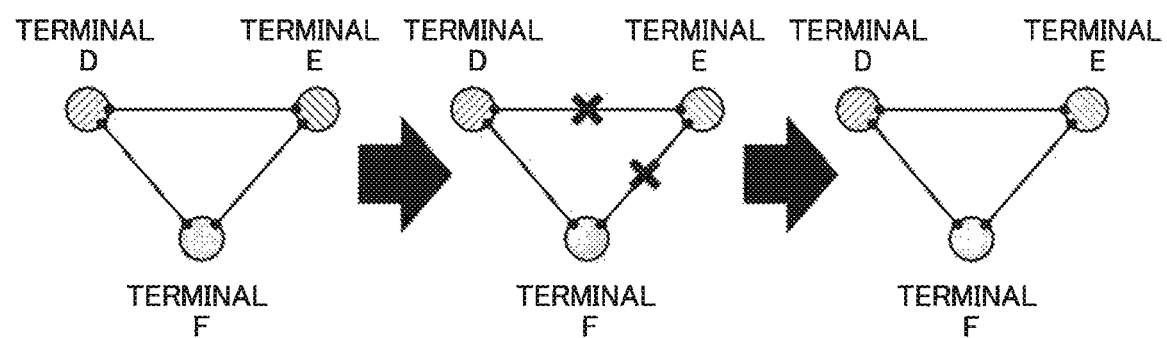
Figure 19A:
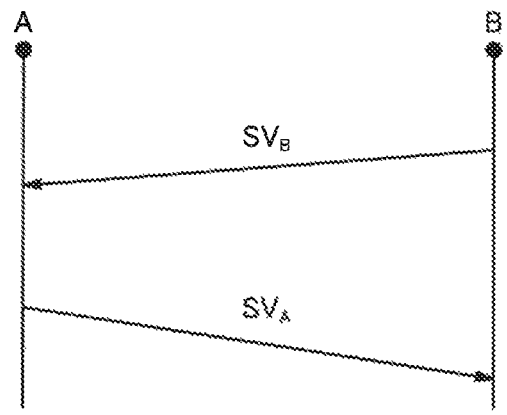
FIGS. 19A, 19B, and 19C are a sequence diagram illustrating a content list exchange method, a diagram illustrating sets of contents held by communication terminals A and B, and a sequence diagram illustrating an unheld content transmission method, respectively.
Figure 19B:
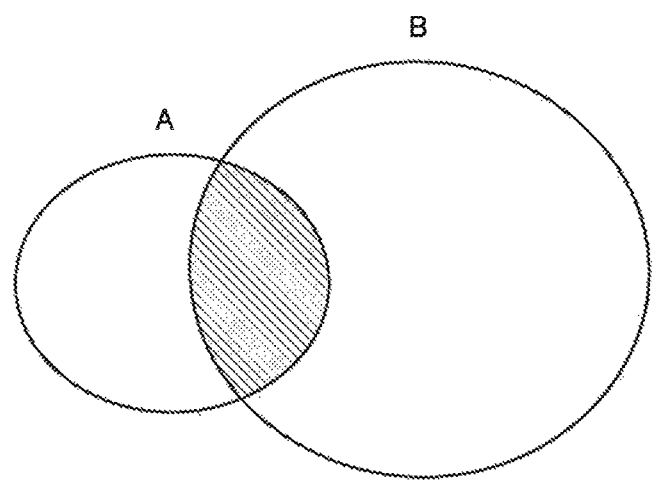
Figure 19C:
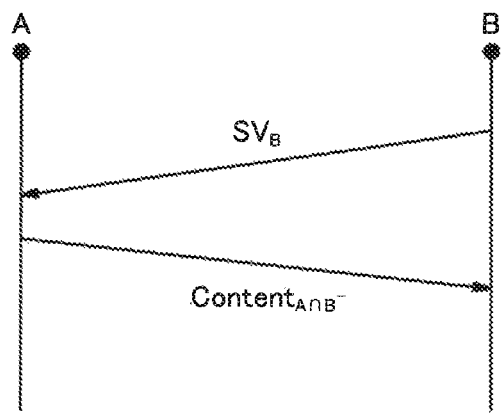

The operation sequence 54 is an operation sequence of receiving an unheld content and is as illustrated in FIG. 17B.

Operation S504 receives the unheld content list transmitted in the operation sequence 53. Operation S504 is an operation in which, in FIG. 15, the communication unit 501 receives an unheld content message and hands over a received content to the application processing unit 509 and the application processing unit 509 stores the substantial data and the content ID of the unheld content in the content DB 502.

An entire operation of the fifth example embodiment in an example in FIG. 1A that is performed through performance of the above respective operations will be described. It is assumed that, on this occasion, content holding statuses at the communication terminals A and B are in accordance with FIG. 1B.

First, each of the communication terminals A and B independently calculates a transmission timing of a content list (process P51 in FIG. 16). At a calculated transmission timing, a communication terminal having a smaller number of contents transmits a content list message with a higher probability. In the case of this example, the communication terminal A transmits a content list message.

The communication terminal B receives the content list message, which the communication terminal A transmits, (operation S401 in FIG. 14A) and, by comparing the received content list with a list of held contents in the content DB in the communication terminal B itself, detects that only a content having a content ID C3 is a duplicate content (operation S402 in FIG. 14A). A duplicate content list message is replied to the communication terminal A, which is the transmission source communication terminal of the content list, (operation S403 in FIG. 14A).

The communication terminal A receives the duplicate content list message from the communication terminal B (operation S501) and detects that the content having the content ID C3 is a duplicate content (operation S502). The communication terminal A recognizes that the communication terminal B does not hold a content other than the content having the content ID C3 and replies a content having a content ID C2 (unheld content) to the communication terminal B (operation S503).

The communication terminal B receives the unheld content and stores the received unheld content in the content DB of the communication terminal B itself (operation S504).

Consequently, in this example, the communication terminal A transmits a content list including the content IDs of two contents held by the communication terminal A itself first with a higher probability, and the communication terminal B, which receives the transmitted content list, detects the content having the content ID C3, which is a duplicate content. The communication terminal B replying a list of the duplicate content to the communication terminal A enables the communication terminal A to transmit a content not held by the communication terminal B and the communication terminal B to acquire the unheld content with a low control load across the network.

Exchange of a content list message and a content message in the fifth example embodiment is illustrated in FIG. 17C. The communication terminal A transmits a content list message relating to a held content(s) held by the communication terminal A itself ($SV_A$ in the FIG. 17C). The communication terminal B that has received the content list message replies a duplicate content list message ($SV_{A \cap B}$ in FIG. 17C). The communication terminal A that has received the duplicate content list message transmits a content message relating to a content(s) not held by the communication terminal B (Content$_{A \cap \neg B}$ in the FIG. 17C).

The above operation enables the communication terminal A to transmit a content not held by the communication terminal B with a low control load without receiving a held content list of the communication terminal B that is expected to have a large size.

Load Load3 required for both communication terminals to detect a duplicate held content when no example embodiment of the present invention was used was indicated by the formula (3). When the fifth example embodiment is employed, since the communication terminal A transmits a content list first, the communication terminal B transmits a duplicate content list, and the communication terminal A transmits a content not held by the communication terminal B, a control load is calculated as follows.

$$\text{Load3} = SVsize_A + SVsize_{A \cap B} + \text{Content}_{A \cap \overline{B}} \quad (18)$$

When $SVsize_B - (SVsize_{A \cap B} + SVsize_{A \cap \neg B}) > 0$ holds, the control load is successfully reduced.

[Summary of Advantageous Effects in Example Embodiments Described Above]

A first advantageous effect is to enable either of communication terminals that have established communication therebetween to detect duplication between held contents with a low control load. This is because a communication terminal having a smaller number of contents transmits a list of held contents first.

A second advantageous effect is to enable both communication terminals that have established communication therebetween to detect duplication between contents held by the respective communication terminals with a low control load. This is because the communication terminal having a smaller number of contents transmits a list of held contents first with a higher probability and the communication terminal having a larger number of contents replies a list of contents held duplicately.

A third advantageous effect is to enable either of communication terminals that have established communication therebetween to transmit a content not held by the other communication terminal to the other communication terminal with a low control load. This is because the communication terminal having a smaller number of contents transmits a list of held contents first with a higher probability. This is also because the communication terminal having a larger number of contents replies a list of contents held duplicately and the communication terminal having a smaller number of contents transmit a content that is not contained in the received duplicate held content list.

The present invention was described above through example embodiments thereof, but the present invention is not limited to the above example embodiments. Various modifications may be made within the scope of the present invention described in the claims, and it is needless to say that such modifications are also included in the scope of the present invention.

Other Example Embodiments

Each of communication terminals in the above-described example embodiments may also be achieved by an information processing device capable of executing a program that achieves the above-described operations. The program may be distributed in a form of a computer-readable recording medium. Reading a program recorded in such a recording medium and executing the program in the information processing device also enables each of communication terminals in the above-described example embodiments to be achieved in a software manner.

The information processing device includes a Central Processing Unit (CPU) and a memory that is configured with a Random Access Memory (RAM) and the like. By use of the information processing device having such a hardware configuration, all or a portion of the communication unit 101, the content DB 102, the content list transmitting and receiving unit 103, and the content list transmission timing determination unit 104 in, for example, FIG. 2A may be achieved. Reading and executing an information sharing program that makes the information processing device achieve functions of the above-described respective components also enables each of communication terminals in the example embodiments of the present invention to be achieved.

In addition, the information sharing program may be distributed in a form of a recording medium recording the program. The program may be distributed in a form of a general-purpose semiconductor recording device, such as a Compact Flash (Registered Trademark) (CF) and a Secure Digital (SD), a magnetic recording medium, such as a flexible disk, an optical recording medium, such as a Compact Disc Read Only Memory (CD-ROM), or the like.

All or part of the example embodiments described above may be described as in the following supplementary notes, but the present invention is not limited thereto.

(Supplementary Note 1) A communication terminal including:

a communication unit that communicates with another terminal;

a content retention unit that retains a content(s);

a content list transmitting and receiving unit that transmits and receives a content list relating to a retained content(s); and a transmission timing determination unit that determines a transmission timing of the content list, based on the number of held contents.

(Supplementary Note 2) The communication terminal according to supplementary note 1 further including a proximate node detection unit that detects a proximate node.

(Supplementary Note 3) The communication terminal according to supplementary note 2, wherein the content list transmitting and receiving unit updates a transmission timing of a content list when a proximate node is detected.

(Supplementary Note 4) The communication terminal according to any one of supplementary notes 1 to 3, wherein 21 the transmission timing determination unit determines whether or not to transmit a content list, based on the number of held contents in the terminal itself.

(Supplementary Note 5) The communication terminal according to any one of supplementary notes 1 to 3, wherein the transmission timing determination unit determines a transmission timing of a content list, based on probability that has a negative correlation with the number of held contents.

(Supplementary Note 6) The communication terminal according to any one of supplementary notes 1 to 3, wherein the transmission timing determination unit determines a transmission timing of a content list, based on interval time that has a positive correlation with the number of held contents in the terminal itself.

(Supplementary Note 7) The communication terminal according to any one of supplementary notes 1 to 3, wherein the transmission timing determination unit determines a transmission timing of a content list, based on back-off time that monotonically increases with respect to the number of held contents in the terminal itself.

(Supplementary Note 8) The communication terminal according to any one of supplementary notes 1 to 3 further including a number-of-held-contents comparison unit that transmits a control message including the number of held contents in the terminal itself, receives a control message including the number of held contents in another terminal, and compares the received number of held contents in the another terminal with the number of held contents in the terminal itself.

(Supplementary Note 9) The communication terminal according to supplementary note 8, wherein the transmission timing determination unit determines whether or not to transmit a content list, based on the number of held contents in the another terminal and the number of held contents in the terminal itself.

(Supplementary Note 10) The communication terminal according to supplementary note 8, wherein the transmission timing determination unit determines a transmission timing of a content list, based on probability that has a negative correlation with at least either a ratio value obtained by dividing the number of held contents in the terminal itself by the number of held contents in the another terminal or a difference value obtained by subtracting the number of held contents in the another terminal from the number of held contents in the terminal itself.

(Supplementary Note 11) The communication terminal according to supplementary note 8, wherein the transmission timing determination unit determines a transmission timing of a content list, based on interval time that has a positive correlation with at least either a ratio value obtained by dividing the number of held contents in the terminal itself by the number of held contents in the another communication terminal or a difference value obtained by subtracting the number of held contents in the another communication terminal from the number of held contents in the terminal itself.

(Supplementary Note 12) The communication terminal according to supplementary note 8, wherein the transmission timing determination unit determines a transmission timing of a content list, based on back-off time that monotonically increases with respect to at least either a ratio value obtained by dividing the number of held contents in the terminal itself by the number of held contents in the another communication terminal or a difference value obtained by subtracting the number of held contents in the another communication terminal from the number of held contents in the terminal itself.

(Supplementary Note 13) The communication terminal according to supplementary note 8, wherein the transmission timing determination unit makes a communication terminal having a smaller number of contents transmit a content list first.

(Supplementary Note 14) The communication terminal according to supplementary note 8, wherein the transmission timing determination unit determines whether or not to transmit a content list, based on a comparison between the number of held contents in the another terminal and the number of held contents in the terminal itself.

(Supplementary Note 15) The communication terminal according to supplementary note 14, wherein the transmission timing determination unit determines to transmit a content list when the number of held contents in the terminal itself is smaller than the number of held contents in the another terminal.

(Supplementary Note 16) The communication terminal according to supplementary note 15, wherein the transmission timing determination unit determines not to transmit a content list when the number of held contents in the terminal itself is larger than the number of held contents in the another terminal.

(Supplementary Note 17) The communication terminal according to any one of supplementary notes 1 to 16, wherein the content list transmitting and receiving unit transmits and receives a duplicate content list in addition to the content list.

(Supplementary Note 18) The communication terminal according to supplementary note 17, wherein the content list transmitting and receiving unit, when receiving a content list, replies the duplicate content list to a terminal that is a content list transmission source.

(Supplementary Note 19) The communication terminal according to any one of supplementary notes 1 to 18 further including
a content transmitting and receiving unit that transmits and receives a content.

(Supplementary Note 20) The communication terminal according to supplementary note 19, wherein
the content transmitting and receiving unit, when receiving a duplicate content list, replies a content not contained in the duplicate content list to a communication terminal that is a duplicate content list transmission source.

(Supplementary Note 21) A communication system including
a communication terminal according to any one of supplementary notes 1 to 20.

(Supplementary Note 22) An information sharing method for detecting a content held duplicately between a plurality of communication terminals, the method including:
retaining a content(s);
transmitting and receiving a content list with another communication terminal;
detecting a duplicate held content; and
determining a transmission timing of a content list, based on the number of held contents.

(Supplementary Note 23) The information sharing method according to supplementary note 22 including
detecting a proximate node.

(Supplementary Note 24) The information sharing method according to supplementary note 23 including
updating a transmission timing of a content list when a proximate node is detected.

(Supplementary Note 25) The information sharing method according to any one of supplementary notes 22 to 24 including
determining whether or not to transmit a content list, based on the number of held contents in a terminal itself.

(Supplementary Note 26) The information sharing method according to any one of supplementary notes 22 to 24 including
determining a transmission timing of a content list, based on probability that has a negative correlation with the number of held contents in a terminal itself.

(Supplementary Note 27) The information sharing method according to any one of supplementary notes 22 to 24 including
determining a transmission timing of a content list, based on interval time that has a positive correlation with the number of held contents in a terminal itself.

(Supplementary Note 28) The information sharing method according to any one of supplementary notes 22 to 24 including
determining a transmission timing of a content list, based on back-off time that monotonically increases with respect to the number of held contents in a terminal itself.

(Supplementary Note 29) The information sharing method according to any one of supplementary notes 22 to 24 including:
transmitting a control message including the number of held contents in a terminal itself;
receiving a control message including the number of held contents in another communication terminal; and
comparing the received number of held contents in the another communication terminal with the number of held contents in the terminal itself.

(Supplementary Note 30) The information sharing method according to supplementary note 29 including
determining whether or not to transmit a content list, based on the number of held contents in the another communication terminal and the number of held contents in the terminal itself.

(Supplementary Note 31) The information sharing method according to supplementary note 29 including
determining a transmission timing of a content list, based on probability that has a negative correlation with at least either a ratio value obtained by dividing the number of held contents in the terminal itself by the number of held contents in the another communication terminal or a difference value obtained by subtracting the number of held contents in the another communication terminal from the number of held contents in the terminal itself.

(Supplementary Note 32) The information sharing method according to supplementary note 29 including
determining a transmission timing of a content list, based on interval time that has a positive correlation with at least either a ratio value obtained by dividing the number of held contents in the terminal itself by the number of held contents in the another communication terminal or a difference value obtained by subtracting the number of held contents in the another communication terminal from the number of held contents in the terminal itself.

(Supplementary Note 33) The information sharing method according to supplementary note 29 including
determining a transmission timing of a content list, based on back-off time that monotonically increases with respect to at least either a ratio value obtained by dividing the number of held contents in the terminal itself by the number of held contents in the another communication terminal or a difference value obtained by subtracting the number of held contents in the another communication terminal from the number of held contents in the terminal itself.

(Supplementary Note 34) The information sharing method according to supplementary note 29, wherein
a communication terminal having a smaller number of contents transmits a content list first.

(Supplementary Note 35) The information sharing method according to supplementary note 29 including
determining whether or not to transmit a content list, based on a comparison between the number of held contents in the another communication terminal and the number of held contents in the terminal itself.

(Supplementary Note 36) The information sharing method according to supplementary note 35 including
determining to transmit a content list when the number of held contents in the terminal itself is smaller than the number of held contents in the another terminal.

(Supplementary Note 37) The information sharing method according to supplementary note 36 including
determining not to transmit a content list when the number of held contents in the terminal itself is larger than the number of held contents in the another terminal.

(Supplementary Note 38) The information sharing method according to any one of supplementary notes 22 to 37 including
transmitting and receiving a duplicate content list in addition to a content list.

(Supplementary Note 39) The information sharing method according to supplementary note 38 including
when receiving a content list, replying a duplicate content list to a communication terminal that is a content list transmission source.

(Supplementary Note 40) The information sharing method according to any one of supplementary notes 22 to 39 including
transmitting and receiving a content list between communication terminals.

(Supplementary Note 41) The information sharing method according to supplementary note 40 including
when receiving a duplicate content list, replying a content not contained in the duplicate content list to a communication terminal that is a duplicate content list transmission source.

(Supplementary Note 42) An information sharing program making a computer function as:
communication means for communicating with another terminal;
content retention means for retaining a content(s);
content list transmitting and receiving means for transmitting and receiving a content list relating to a retained content(s); and
transmission timing determination means for determining a transmission timing of the content list, based on the number of held contents.

(Supplementary Note 43) The information sharing program according to supplementary note 42 further making the computer function as
proximate node detection means for detecting a proximate node.

(Supplementary Note 44) The information sharing program according to supplementary note 43, wherein
the content list transmitting and receiving means updates a transmission timing of a content list when a proximate node is detected.

(Supplementary Note 45) The information sharing program according to any one of supplementary notes 42 to 44, wherein
the transmission timing determination means determines whether or not to transmit a content list, based on the number of held contents in a terminal itself.

(Supplementary Note 46) The information sharing program according to any one of supplementary notes 42 to 44, wherein
the transmission timing determination means determines a transmission timing of a content list, based on probability that has a negative correlation with the number of held contents.

(Supplementary Note 47) The information sharing program according to any one of supplementary notes 42 to 44, wherein
the transmission timing determination means determines a transmission timing of a content list, based on interval time that has a positive correlation with the number of held contents in a terminal itself.

(Supplementary Note 48) The information sharing program according to any one of supplementary notes 42 to 44, wherein
the transmission timing determination means determines a transmission timing of a content list, based on back-off time that monotonically increases with respect to the number of held contents in a terminal itself.

(Supplementary Note 49) The information sharing program according to any one of supplementary notes 42 to 44 further making the computer function as
a number-of-held-contents comparison means for transmitting a control message including the number of held contents in a terminal itself, receiving a control message including the number of held contents in another terminal, and comparing the received number of held contents in the another terminal with the number of held contents in the terminal itself.

(Supplementary Note 50) The information sharing program according to supplementary note 49, wherein
the transmission timing determination means determines whether or not to transmit a content list, based on the number of held contents in the another terminal and the number of held contents in the terminal itself.

(Supplementary Note 51) The information sharing program according to supplementary note 49, wherein
the transmission timing determination means determines a transmission timing of a content list, based on probability that has a negative correlation with at least either a ratio value obtained by dividing the number of held contents in the terminal itself by the number of held contents in the another terminal or a difference value obtained by subtracting the number of held contents in the another terminal from the number of held contents in the terminal itself.

(Supplementary Note 52) The information sharing program according to supplementary note 49, wherein
the transmission timing determination means determines a transmission timing of a content list, based on interval time that has a positive correlation with at least either a ratio value obtained by dividing the number of held contents in the terminal itself by the number of held contents in the another communication terminal or a difference value obtained by subtracting the number of held contents in the another communication terminal from the number of held contents in the terminal itself.

(Supplementary Note 53) The information sharing program according to supplementary note 49, wherein
the transmission timing determination means determines a transmission timing of a content list, based on back-off time that monotonically increases with respect to at least either a ratio value obtained by dividing the number of held contents in the terminal itself by the number of held contents in the another communication terminal or a difference value obtained by subtracting the number of held contents in the another communication terminal from the number of held contents in the terminal itself.

(Supplementary Note 54) The information sharing program according to supplementary note 49, wherein
the transmission timing determination means makes a communication terminal having a smaller number of contents transmit a content list first.

(Supplementary Note 55) The information sharing program according to supplementary note 49, wherein
the transmission timing determination means determines whether or not to transmit a content list, based on a comparison between the number of held contents in the another terminal and the number of held contents in the terminal itself.

(Supplementary Note 56) The information sharing program according to supplementary note 55, wherein
the transmission timing determination means determines to transmit a content list when the number of held contents in the terminal itself is smaller than the number of held contents in the another terminal.

(Supplementary Note 57) The information sharing program according to supplementary note 56, wherein
the transmission timing determination means determines not to transmit a content list when the number of held contents in the terminal itself is larger than the number of held contents in the another terminal.

(Supplementary Note 58) The information sharing program according to any one of supplementary notes 42 to 57, wherein
a content list transmitting and receiving means transmits and receives a duplicate content list in addition to the content list.

(Supplementary Note 59) The information sharing program according to supplementary note 58, wherein
a content list transmitting and receiving means, when receiving a content list, replies the duplicate content list to a terminal that is a content list transmission source.

(Supplementary Note 60) The information sharing program according to any one of supplementary notes 42 to 59 further making the computer function as
a content transmitting and receiving means for transmitting and receiving a content.

(Supplementary Note 61) The information sharing program according to supplementary note 60, wherein
the content transmitting and receiving means, when receiving a duplicate content list, replies a content not contained in the duplicate content list to a communication terminal that is a duplicate content list transmission source.

The present invention was described above by use of the above-described example embodiments as exemplary examples. However, the present invention is not limited to the above-described example embodiments. That is, various modes that could be understood by a person skilled in the art may be applied to the present invention within the scope of the present invention.

REFERENCE SIGNS LIST 100, 200, 300, 400, 500 Communication terminal
101, 201, 301, 401, 501 Communication unit
102, 202, 302, 402, 502 Content DB
103, 203, 303 Content list transmitting and receiving unit
104, 204, 304 Content list transmission timing determination unit
108, 208, 308, 408, 508 Content list management unit
205, 305 Proximate node detection unit
403, 503 Integrated content list transmitting and receiving unit
109, 509 Application processing unit

The invention claimed is:

1. A communication terminal comprising:
a communication unit that communicates with another terminal;
a content retention unit that holds a content;
a content list transmitting and receiving unit that transmits and receives a content list relating to a held content;
a transmission timing determination unit that determines a transmission timing of the content list, based on a number of held contents; and
a number-of-held-contents comparison unit that transmits a control message including the number of held contents in the terminal itself, receives a control message including the number of held contents in another terminal, and compares the received number of held contents in the another terminal with the number of held contents in the communication terminal itself,
wherein the transmission timing determination unit determines whether or not to transmit the content list, based on the comparison between the number of held contents in the another terminal and the number of held contents in the communication terminal itself, and determines to transmit the content list when the number of held contents in the communication terminal itself is smaller than the number of held contents in the another terminal.

2. The communication terminal according to claim 1, further comprising
a proximate node detection unit that detects a proximate node.

3. The communication terminal according to claim 2, wherein
the content list transmitting and receiving unit updates the transmission timing of the content list when a proximate node is detected.

4. The communication terminal according to claim 1, wherein
the transmission timing determination unit determines whether or not to transmit the content list, based on the number of held contents in the communication terminal itself.

5. The communication terminal according to claim 1, wherein
the transmission timing determination unit determines the transmission timing of the content list, based on probability that has a negative correlation with the number of held contents.

6. The communication terminal according to claim 1, wherein
the transmission timing determination unit determines the transmission timing of the content list, based on interval time that has a positive correlation with the number of held contents in the communication terminal itself.

7. The communication terminal according to claim 1, wherein
the transmission timing determination unit determines the transmission timing of the content list, based on back-off time that monotonically increases with respect to the number of held contents in the communication terminal itself.

8. The communication terminal according to claim 1, wherein
the transmission timing determination unit determines whether or not to transmit a content list, based on the number of held contents in the another terminal and the number of held contents in the communication terminal itself.

9. The communication terminal according to claim 1, wherein
the transmission timing determination unit determines the transmission timing of the content list, based on probability that has a negative correlation with at least either a ratio value obtained by dividing the number of held contents in the communication terminal itself by the number of held contents in the another terminal or a difference value obtained by subtracting the number of held contents in the another terminal from the number of held contents in the communication terminal itself.

10. The communication terminal according to claim 1, wherein
the transmission timing determination unit determines the transmission timing of the content list, based on interval time that has a positive correlation with at least either a ratio value obtained by dividing the number of held contents in the communication terminal itself by the number of held contents in the another communication terminal or a difference value obtained by subtracting the number of held contents in the another communication terminal from the number of held contents in the communication terminal itself.

11. The communication terminal according to claim 1, wherein
the transmission timing determination unit determines the transmission timing of the content list, based on back-off time that monotonically increases with respect to at least either a ratio value obtained by dividing the number of held contents in the communication terminal itself by the number of held contents in the another communication terminal or a difference value obtained by subtracting the number of held contents in the another communication terminal from the number of held contents in the communication terminal itself.

12. The communication terminal according to claim 1, wherein
the transmission timing determination unit makes the communication terminal having a smaller number of contents transmit a content list first.

13. The communication terminal according to claim 1, wherein
the transmission timing determination unit determines not to transmit the content list when the number of held contents in the communication terminal itself is larger than the number of held contents in the another terminal.

14. A communication system comprising
a communication terminal according to claim 1.

15. An information sharing method for detecting a content held duplicately between a plurality of communication terminals, the method comprising:
holding the content;
transmitting and receiving a content list with another communication terminal;
detecting a duplicate held content;
determining a transmission timing of the content list, based on a number of held contents; and
transmitting a control message including the number of held contents in the terminal itself, receiving a control message including the number of held contents in another terminal, and comparing the received number of held contents in the another terminal with the number of held contents in the communication terminal itself,
wherein the determining the transmission timing of the content list further comprises:
determining whether or not to transmit the content list, based on the comparison between the number of held contents in the another terminal and the number of held contents in the communication terminal itself, and
determining to transmit the content list when the number of held contents in the communication terminal itself is smaller than the number of held contents in the another terminal.

16. A non-transitory computer readable medium comprising an information sharing program making a computer function as:
communication means for communicating with another terminal;
content retention means for holding a content;
content list transmitting and receiving means for transmitting and receiving a content list relating to a held content;
transmission timing determination means for determining a transmission timing of the content list, based on a number of held contents; and
number-of-held-contents comparison means for transmitting a control message including the number of held contents in the terminal itself, receiving a control message including the number of held contents in another terminal, and comparing the received number of held contents in the another terminal with the number of held contents in the communication terminal itself,
wherein the transmission timing determination means determines whether or not to transmit the content list, based on the comparison between the number of held contents in the another terminal and the number of held contents in the communication terminal itself, and determines to transmit the content list when the number of held contents in the communication terminal itself is smaller than the number of held contents in the another terminal.

* * * * *